(12) United States Patent
Bastawros et al.

(10) Patent No.: US 11,022,744 B2
(45) Date of Patent: Jun. 1, 2021

(54) MULTILAYER POLYMERIC FILMS AND THE METHODS OF MAKING THEREOF

(71) Applicant: SABIC GLOBAL TECHNOLOGIES B.V., Bergen Op Zoom (NL)

(72) Inventors: Adel Fawzy Bastawros, Mt. Vernon, IN (US); Yuan Zhou, Pudong (CN); Wei Feng, Pudong (CN); Chuntao Tang, Pudong (CN)

(73) Assignee: SABIC GLOBAL TECHNOLOGIES B.V., Bergen Op Zoom (NL)

( * ) Notice: Subject to any disclaimer, the term of this patent is extended or adjusted under 35 U.S.C. 154(b) by 0 days.

(21) Appl. No.: 16/613,440

(22) PCT Filed: Jun. 4, 2018

(86) PCT No.: PCT/US2018/035803
§ 371 (c)(1),
(2) Date: Nov. 14, 2019

(87) PCT Pub. No.: WO2018/226558
PCT Pub. Date: Dec. 13, 2018

(65) Prior Publication Data
US 2020/0166692 A1 May 28, 2020

Related U.S. Application Data

(60) Provisional application No. 62/515,175, filed on Jun. 5, 2017.

(51) Int. Cl.
*F21V 8/00* (2006.01)
*B32B 27/08* (2006.01)
(Continued)

(52) U.S. Cl.
CPC ............ *G02B 6/0051* (2013.01); *B32B 27/08* (2013.01); *B32B 27/308* (2013.01);
(Continued)

(58) Field of Classification Search
CPC .. G02B 6/0051; G02B 6/0053; G02B 5/0268; G02B 5/02; B32B 27/08; B32B 27/365;
(Continued)

(56) References Cited

U.S. PATENT DOCUMENTS

| 4,513,048 A | 4/1985 | Kaube et al. |
| 6,087,007 A | 7/2000 | Fujii et al. |

(Continued)

FOREIGN PATENT DOCUMENTS

| CN | 102303438 A | 1/2012 |
| CN | 105705332 A | 6/2016 |

(Continued)

OTHER PUBLICATIONS

Lexan SLX 11010/11A13 Film Product Datasheet (Aug. 2011) (Year: 2011).*

(Continued)

*Primary Examiner* — Rajarshi Chakraborty
*Assistant Examiner* — Glenn D Zimmerman
(74) *Attorney, Agent, or Firm* — Cantor Colburn LLP

(57) ABSTRACT

A multilayer polymeric film includes a top layer comprising poly(methyl methacrylate); a bottom layer comprising a bottom layer composition comprising poly(methyl methacrylate), polycarbonate, copolymers thereof, or a combination comprising at least one of the foregoing, wherein a glass transition temperature of the bottom layer composition is less than or equal to 140° C.; and an inner layer disposed between an inside surface of the top layer and an inside surface of the bottom layer, wherein the inner layer comprises polycarbonate.

18 Claims, 8 Drawing Sheets

(51) Int. Cl.
*B32B 27/30* (2006.01)
*B32B 27/36* (2006.01)

(52) U.S. Cl.
CPC ........ *B32B 27/365* (2013.01); *B32B 2250/03* (2013.01); *B32B 2250/24* (2013.01); *B32B 2307/412* (2013.01); *B32B 2307/538* (2013.01); *B32B 2307/584* (2013.01); *B32B 2457/20* (2013.01); *G02B 6/0053* (2013.01)

(58) Field of Classification Search
CPC ............ B32B 27/308; B32B 2307/584; B32B 2307/538; B32B 2457/20; B32B 2307/412; B32B 2250/03; B32B 2250/24
See application file for complete search history.

(56) References Cited

U.S. PATENT DOCUMENTS

| | | | |
|---|---|---|---|
| 7,585,565 | B2 | 9/2009 | Schultes et al. |
| 7,889,427 | B2 | 2/2011 | Bastawros et al. |
| 7,923,100 | B2 | 4/2011 | Tripathi et al. |
| 9,023,912 | B2 * | 5/2015 | Morizur ................ C08G 79/04 522/35 |
| 9,067,389 | B2 | 6/2015 | Hoess et al. |
| 9,720,155 | B2 | 8/2017 | Zhou et al. |
| 2004/0032658 | A1 | 2/2004 | Fleming |
| 2008/0004404 | A1* | 1/2008 | van de Grampel ..... C08L 69/00 525/439 |
| 2013/0059158 | A1 | 3/2013 | Oguro et al. |
| 2013/0309474 | A1* | 11/2013 | Peek ........................ C08K 7/06 428/220 |
| 2014/0199536 | A1 | 7/2014 | Kappacher et al. |
| 2014/0287225 | A1* | 9/2014 | Hirano ................... B32B 27/36 428/331 |
| 2015/0109755 | A1* | 4/2015 | Noguchi ............. G02B 6/0056 362/19 |
| 2015/0277110 | A1 | 10/2015 | Oh et al. |
| 2016/0347040 | A1* | 12/2016 | Feng ........................ C08J 7/042 |
| 2017/0045655 | A1* | 2/2017 | Zhou ...................... B32B 27/08 |
| 2017/0210104 | A1 | 7/2017 | Doo et al. |

FOREIGN PATENT DOCUMENTS

| | | | |
|---|---|---|---|
| JP | 0885182 A | 4/1996 | |
| JP | H0885182 A | 4/1996 | |
| JP | 3406391 B2 | 5/2003 | |
| JP | 3451785 B2 | 9/2003 | |
| KR | 20160031249 A | 3/2016 | |
| WO | 2013175448 A1 | 11/2013 | |
| WO | 2014072923 A1 | 5/2014 | |
| WO | WO-2015125102 A1 * | 8/2015 | .......... B32B 27/308 |
| WO | 2015168610 A1 | 11/2015 | |
| WO | WO-2015168610 A1 * | 11/2015 | ............ B29C 48/21 |

OTHER PUBLICATIONS

Lexan SLX 11010BC Film Product Datasheet (Apr. 2008) (Year: 2008).*
International Preliminary Report on Patentablility; International Application No. PCT/US2018/035803; International Filing Date: Jun. 4, 2018; dated Sep. 17, 2019, 14 pages.
International Search Report; International Application No. PCT/US2018/035803; International Filing Date: Jun. 4, 2018; dated Nov. 9, 2018; 7 pages.
Written Opinion; International Application No. PCT/US2018/035803; International Filing Date: Jun. 4, 2018; dated Nov. 9, 2018; 12 pages.

* cited by examiner

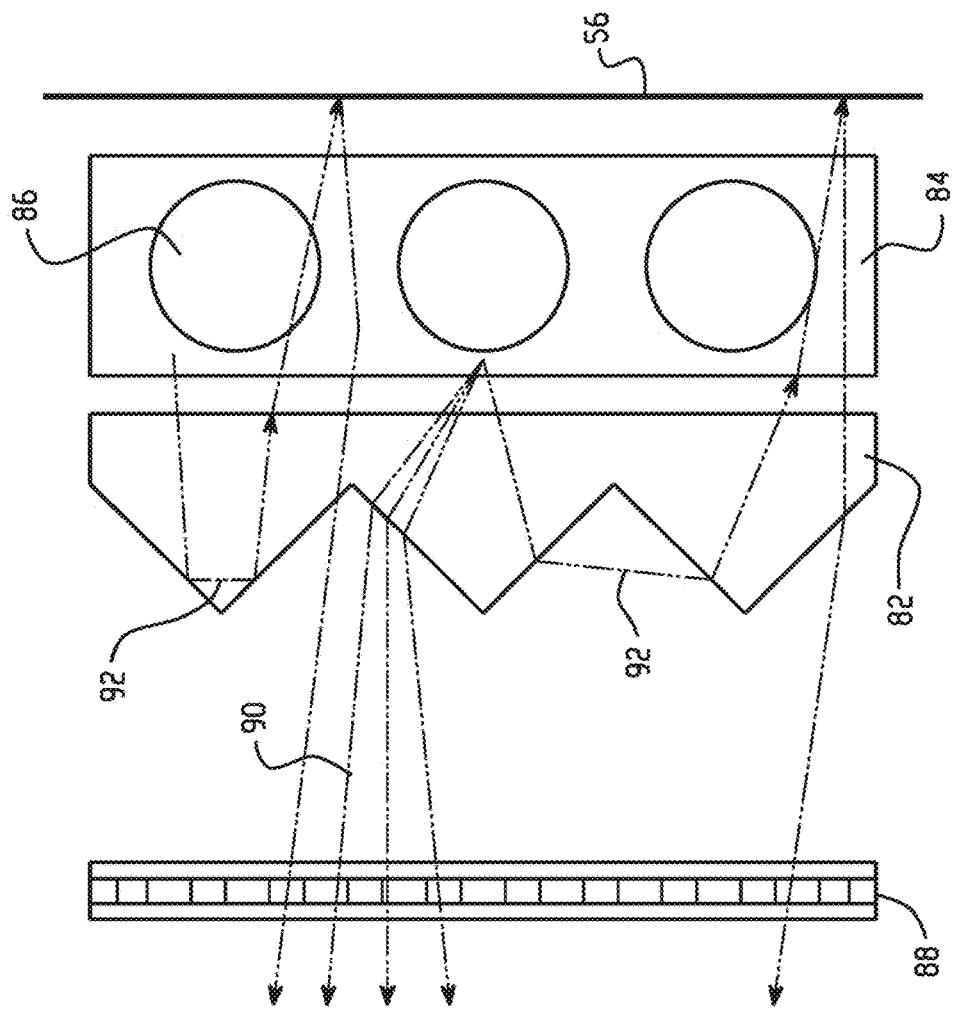
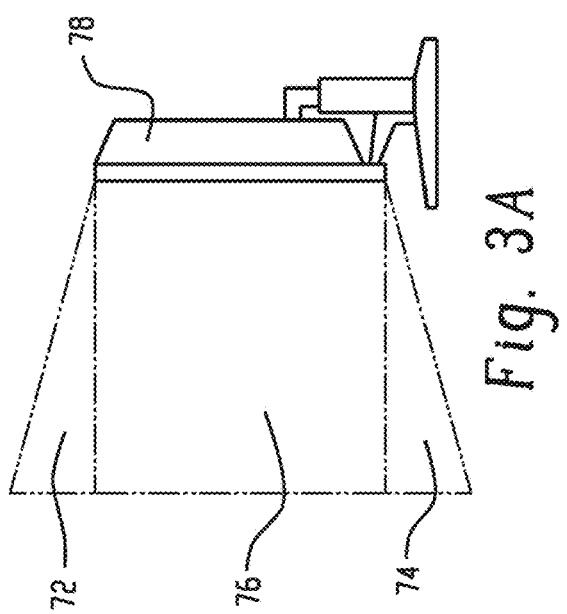
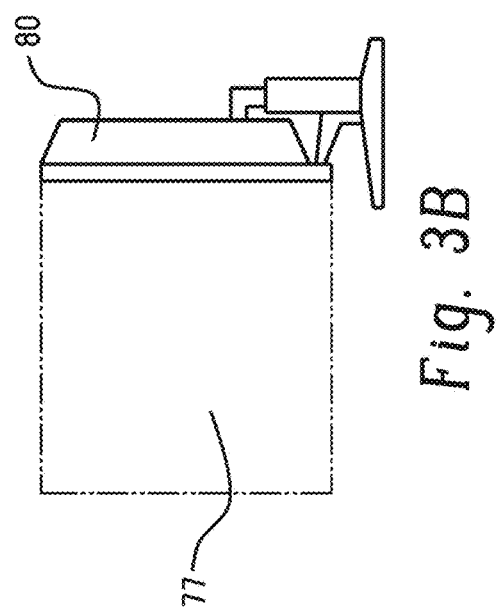
Fig. 3A
Fig. 3B
Fig. 3C

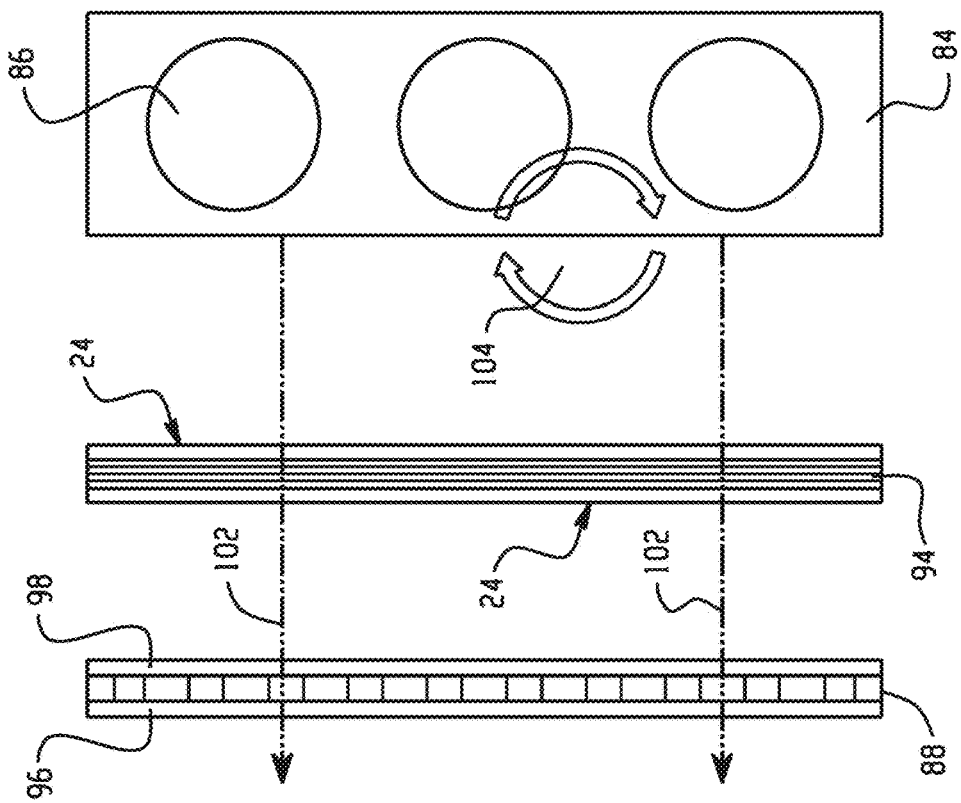
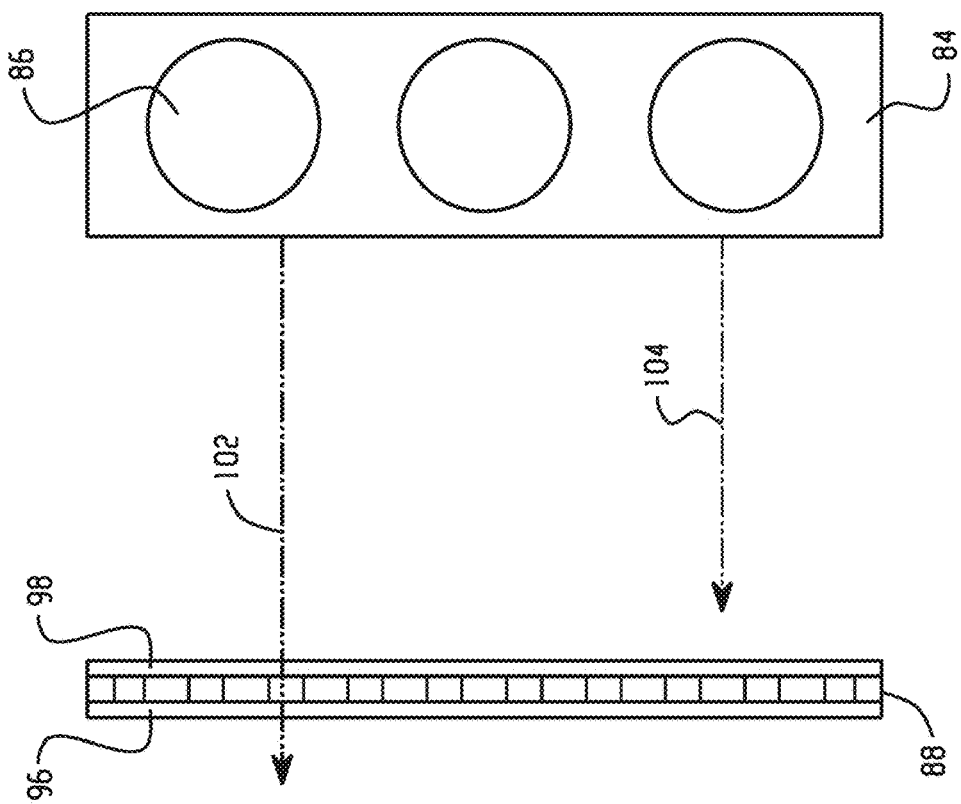

MULTILAYER POLYMERIC FILMS AND THE METHODS OF MAKING THEREOF

CROSS REFERENCE TO RELATED APPLICATIONS

This application is a 371 of International Application No. PCT/US2018/035803, filed Jun. 4, 2018, which is incorporated by reference in its entirety, and which claims priority to U.S. Application Ser. No. 62/515,175, filed Jun. 5, 2017.

BACKGROUND

Multilayer films are used in various electronic and display products. Multilayer films can provide functional and alternative properties as compared to a standard stack consisting of multiple single films adhered to one another with an adhesive or adhesive layer. To meet performance challenges, desire for lower cost, and customer demand for thinner films stacks, it is desirable to integrate different kinds of functional optical films into a single film. Such integration can provide thinner films, efficiency and cost savings in the assembly process as well as improving optical performance by reduction in the amount of light lost during transmission through the films.

The films can be configured to direct, diffuse, or polarize light. Brightness enhancement films (BEF) are used to direct light by using structures, such as prisms, on the surfaces thereof to direct light along a viewing axis. Such BEF films enhance the brightness of the display viewed by a user and allow less power to be consumed in creating a desired level of on-axis illumination. BEF films can be used in a wide variety of applications including, but not limited to, televisions, computer screens, projection displays, traffic signals, and other illuminated signs. A reflective polarizer film such as a dual brightness enhancement film (DBEF) is a recycling, light management film that is used to increase the brightness of backlights used in a liquid crystal (LCD) display or in light emitting diodes (LED). Stated another way, a reflective polarizer film is a thin film reflective polarizer that increases brightness over the entire viewing range. Reflective polarizer films are a component of a backlight module, which can increase brightness. Reflective polarize films can capture and use light normally lost to absorption in a bottom LCD polarizer and redirect it, allowing the light to exit the LCD backlight assembly at a desired angle. Reflective polarizer films reuse the light of the backlight unit by utilizing a recycling light mechanism that makes the light pass through many refractive index optical material layers and fully reflect.

Thus, there is a need for integrated articles and films providing excellent functionality as compared to current optical film stacks.

SUMMARY

Disclosed, in various embodiments, are multilayer polymeric films and methods of making thereof.

A multilayer polymeric film includes a top layer comprising poly(methyl methacrylate); a bottom layer comprising a bottom layer composition comprising poly(methyl methacrylate), polycarbonate, copolymers thereof, or a combination comprising at least one of the foregoing, wherein a glass transition temperature of the bottom layer composition is less than or equal to 140° C.; and an inner layer disposed between an inside surface of the top layer and an inside surface of the bottom layer, wherein the inner layer comprises polycarbonate.

A multilayer polymeric film includes: a top layer comprising a material with a glass transition temperature of 100 to 150° C.; a bottom layer comprising a bottom layer composition; and an inner layer disposed between an inside surface of the top layer and an inside surface of the bottom layer, wherein a glass transition temperature of the inner layer is 125 to 175° C.; wherein a glass transition temperature of the bottom layer is 0.25 to 75° C. lower than the glass transition temperature of the top layer or the inner layer.

These and other features and characteristics are more particularly described below.

BRIEF DESCRIPTION OF THE DRAWINGS

The following is a brief description of the drawings wherein like elements are numbered alike and which are presented for the purposes of illustrating the exemplary embodiments disclosed herein and not for the purposes of limiting the same.

FIG. 3A is a side view of the reflected light in a system without an optical film.

FIG. 3B is a side view of the reflective light in a system with an optical film.

FIG. 3C is a view of light passing through a system with an optical film.

FIG. 4A is a view of light passing through a system without an optical film.

FIG. 4B is a view of light passing through a system with an optical film.

DETAILED DESCRIPTION

Figure 1:
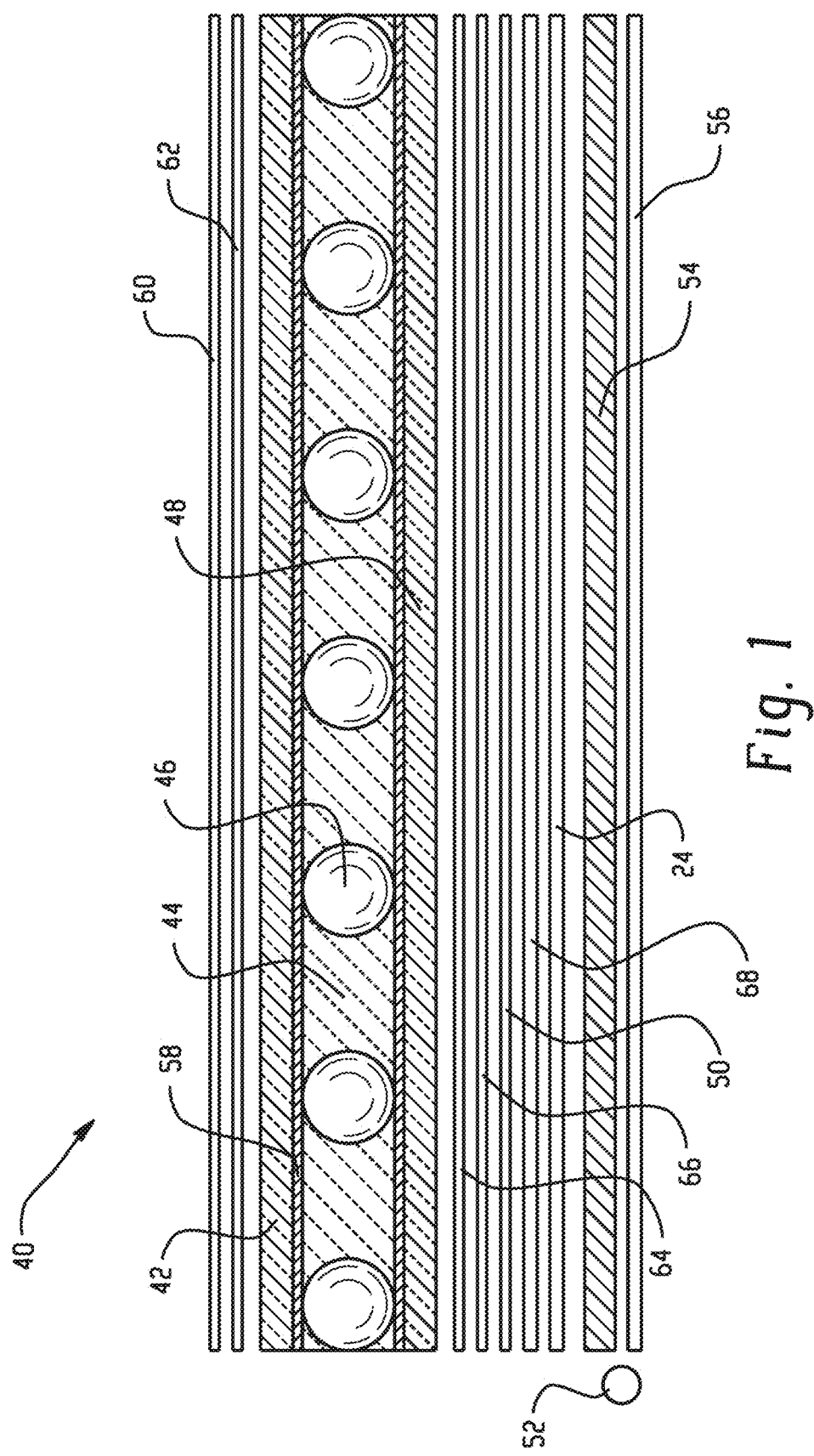
FIG. 1 is a cross-sectional view of a liquid crystal display.

Adhesives are often used to bond films together. Without an adhesive, the bond is insufficient, and/or the layers must be heated to a temperature that adversely affects optical properties (e.g., causes an increase in yellowness index). When the adhesive is used, sufficient bond strength can be attained. However, the adhesive can adversely affect optical properties of the final article, defects can be created between the films (e.g., air bubbles, delamination, decreased luminance, decreased light transmission, etc.). In the present disclosure, it was determined that the addition of surface texture to the surface of the layer to be bonded, and wherein that layer is made from a composition having a glass transition temperature (Tg) that is 0.25 to 75° lower than the glass transition temperature of the top layer or the inner layer, no adhesive layer is needed, and optical properties are maintained. The Tg of the bottom layer can be such that it is able to be softened when heating during a lamination process to another film. Without wishing to be bound by theory, it is believed that during lamination, the heat from the lamination process softens the bottom layer, but does not reach the top layer or the middle layer. Additionally, the multilayer films disclosed herein can offer a simpler process without the extra steps required when using an adhesive or an adhesive layer.

Disclosed herein are multilayer polymeric films as well as methods of making thereof. The multilayer polymeric films can provide enhanced lamination performance when the multilayer polymeric films are attached to another film without the use of an adhesive layer therebetween. A multilayer polymeric film can be attached to another film (such as an optical film) wherein the side of the layer of the multilayer polymeric film to be attached to the other film will have a fine texture as is defined below, and will have a Tg that is below 140° C. For example, the multilayer polymeric film can include a top layer, a bottom layer, and an inner layer disposed between the top layer and the bottom layer. A glass transition temperature of the bottom layer composition can allow lamination of the multilayer polymeric film to another film without comprising the structural or mechanical properties of either film and without an adhesive layer therebetween. A roughness value, e.g., Rz, of an outer surface (e.g., a bottom surface) of the bottom layer can be less than or equal to 0.75 μm, for example, less than or equal to 0.5 μm. These roughness levels can assist in allowing successful lamination of the multilayer film to another film without the use of an adhesive or adhesive layer. Higher roughness values can negatively affect the lamination of the multilayer polymeric film to the other film. The multilayer film disclosed herein can offer improved surface properties, such as pencil hardness, which can avoid the added step of applying a coating to the multilayer film to protect from scratches and other marks.

The top layer of the multilayer film can be formed from poly(methyl methacrylate). The top layer can be configured to provide anti-scratch properties to the multilayer polymeric film. The inner layer can be formed from polycarbonate. The inner layer can be configured to provide mechanical strength and optical properties to the multilayer polymeric film. The bottom layer can be configured to provide enhanced lamination performance when the multilayer polymeric film is attached to another film. It was surprisingly found that the addition of surface texture to the outer surface (i.e., bottom surface) of the bottom layer and the use of a bottom layer composition having a glass transition temperature of below 140° C. allows the lamination of the multilayer polymeric film directly to another optical film without the use of an adhesive or an adhesive layer therebetween. For example, when the multilayer polymeric film is attached directly to an optical film (such as a brightness enhancement film (BEF) or a reflective polarizer film (e.g., a dual brightness enhancement film (DBEF)), the bottom layer can provide enhanced lamination thereto without an adhesive layer disposed therebetween. Enhanced lamination as referred to herein generally refers to enhanced bonding strength between a multilayer film and another optical film, whereas traditional bonding with an adhesive or adhesive layer can have lower bonding and delamination issues. The enhanced lamination is with respect to the bonding attained using an adhesive. For example, enhanced lamination performance can include attachment of various layers without creating bubbles or cosmetic defects at an interface between the layers.

The multilayer films described herein include at least three layers of transparent thermoplastic resins. As used herein, transparent means a light transmission of each thermoplastic resin (Tvis) of at least 85%. As used herein, Tvis and haze are measured in accordance with Gardner Hazeplus instrument designed per ASTM D1003-00, Procedure A with D65 illuminant and 10-degree observer angle. For example, the multilayer film can include a top layer, a bottom layer, and an inner layer disposed between the top layer and the bottom layer. The top layer can be made from a material that provides anti-scratch properties and abrasion resistance, while retaining optical properties. For example, a pencil hardness of the top layer can be greater than or equal to 2B, for example, H, for example, 2H, for example, H-2H at a thickness of 5 to 20 micrometers (μm). The top layer can be a material such as poly(methyl methacrylate). The top layer can include the primary surface texture as described below. The primary surface texture on the outer surface of the top layer (i.e., on the top surface) can affect mechanical abrasion behavior of the multilayer article, and hence, abrasion resistant materials are desired.

The inner layer can comprise a material that includes polycarbonate.

The bottom layer can include a bottom layer composition including a material that is transparent and that has a Tg of less than or equal to 140° C., for example, 95 to 130° C., for example, 100 to 110° C. The bottom layer can include a bottom layer composition comprising PMMA, polycarbonate, polyester, or a combination comprising at least one of the foregoing, such as a polycarbonate based copolymer, blend, or alloy. The bottom layer can include a bottom layer composition made from PMMA. The bottom layer composition can include a copolymer of polycarbonate and polyester (such as amorphous polyester). The bottom layer composition can include a poly(aliphatic ester) polycarbonate copolymer. The bottom layer composition can have a lower glass transition temperature than general polycarbonate. For example, the bottom layer composition can have a lower glass transition temperature than the polycarbonate used in the inner layer. A glass transition temperature of the bottom layer can be less than or equal to 140° C. A glass transition temperature of the bottom layer can be 100° C. to 140° C. A glass transition temperature of the bottom layer can be 100° C. to 110° C. A glass transition temperature of the bottom layer can be 110° C. The lower glass transition temperature of the bottom layer can assist in allowing lamination of the multilayer polymeric film to another film without compromising the structural features of the multilayer film, such as the primary surface texture, or without compromising the structural features of the film to which it is being attached. This glass transition temperature can allow bottom layer composition to soften at a low enough temperature that will not compromise the structural integrity, physical, or mechanical properties of either the multilayer film or the film to which it is attached, during the lamination process to the optical film.

The thickness of each layer is dependent upon the features of that layer. For example, the top layer has a top layer thickness sufficient to accommodate the primary surface texture. The top layer thickness can be greater than 1.5 times Rz of the primary surface texture. Rz can generally be described as the maximum height of an assessed profile, given by summation of the highest peaks of the profile (Rp) and the deepest valleys of the profile (Rv) averaged for the numbers of the sampling lengths within an evaluation length of the profile. Stated another way, the top layer thickness can be 1 micrometer (μm) to 50 μm, for example, 1 μm to 30 μm. or 5 μm to 30 μm. A thickness of the inner layer can be 25 μm to 300 μm, for example, 50 μm to 200 μm. A thickness of the bottom layer can be 0.5 μm to 25 μm, for example, 1 μm to 10 μm. Light management function of the multilayer film can be addressed with surface texture having light management abilities, such as diffusion ability or light turning/directing ability. For example, a primary surface texture for light management function is created onto an outer surface of the top layer, i.e., the top surface.

When diffusion ability is desired, a generally random matte surface texture comprising matte topography of peaks and valleys of non-particular geometry can provide strong light diffusion functionality and uniform light distribution over the surface area of the film. The generally matte surfaces are typically characterized by means of standard surface finish attributes such as Average Roughness (Ra) or Peaks Count (Rpc). Diffuser films with general matte surfaces having an Ra of less than 1.2 micrometers (μm) and an Rpc of more than 50 peaks per centimeter (peaks/cm) (referred to herein as "fine texture") can be beneficial for superior image quality, e.g., in Ultra-High Definition (UHD) displays. Diffuser films with matte surfaces having an Ra of less than 1.0 μm and a Rpc of more than 80 peaks/cm can be more beneficial, e.g., for UHD displays and similar applications. Diffuser films with matte surfaces having a Ra that is less than 0.7 μm and a Rpc of more than 100 peaks/cm can be even more beneficial for displays. When the texture of the sheet has relatively large average roughness (e.g., Ra>1.2 μm) and Rpc is lower than 50 peaks/cm, the sheet can have graininess appearance, for example, when used in display applications. Not to be bound by theory, this is believed to be caused by an optical lensing effect of large peak or valley surface features that are at scattered and isolated surface locations. The graininess appearance becomes visible and is regarded as a defect when the size of the peak or valley feature is comparable to or larger than the pixel size of the display. Peak count (Rpc) refers to as the number of local roughness peaks and valleys which project through a selectable band centered around the profile mean line. The count is determined over the evaluation length and is reported in peaks per centimeter. Surface Roughness (Ra) and Peak count (Rpc) are measured using standard surface profiling instruments such as Kosaka 1700a Profilometer from Kosaka Laboratories, Tokyo, Japan. The procedures set forth in ISO 4287:1997 are followed to configure the instrument and measure the surface profile parameters such as Ra, Rp, Rv, Rz and Rpc. Rz is given by summation of the highest profile peak (Rp) and the deepest profile valley (Rv) according to ISO 4287. A scan length of at least 5.6 mm (giving at least a 4.0 mm net evaluation length), a Gaussian data filter, and a 0.8 mm filer cut-off are used. For peak counting, a ±0.5 μm symmetric band around the profile mean line was set to report Rpc. For the examples and comparative examples in this application, the surface profile data of a surface texture are measured with 5 profile scans along the extrusion direction (i.e., machine direction) of the film/sheet web and another 5 profile scans along the transverse direction of the web, and then the averaged surface profile data of the total 10 scans are recorded as the result.

When light turning/directing ability is desired, a specially structured surface texture that comprises a plurality of microstructure elements of distinctive geometry such as microlens, prisms, pyramids, or lenticular lens can provide, for example light turning functionality while providing the hiding power necessary to mask light source arrangement details or structural patterns on components of a display. The specially structured surface textures are typically characterized by geometric attributes of the individual microstructure elements.

The primary surface texture on the top layer, top surface can comprise a plurality of geometric microstructure elements including microlenses, polyhedral shapes (e.g., prisms, pyramidal shapes, cube corner shapes, and so forth), lenticular shapes, generally matte surface features, and combinations comprising at least one of the foregoing. The average aspect ratio (i.e., height to width) of these geometric shapes is greater than or equal to 0.05. The primary surface texture can include only a generally matte surface texture with Ra that is equal to or less than 1.2 micrometers, and Rpc can be greater than or equal to 50 peaks/cm. Optionally, the primary surface texture can be formed through the inclusion of one or more protruded additive particles that are at least partially embedded in the top layer of a multilayer polymeric article.

The bottom layer can have an outer surface with an average surface roughness Rz of less than or equal to 0.75 μm, for example, less than or equal to 0.5 μm. The bottom layer can have random surface texture since the bottom layer is not responsible for light management as is the top layer. A low Rz on the bottom layer can help ensure that lamination to another film is successful. As previously described herein, Rz is given by the summation of the highest profile peak (Rp) and the deepest profile valley (Rv) according to ISO 4287. A scan length of at least 5.6 mm (giving at least a 4.0 mm net evaluation length), a Gaussian data filter, and a 0.8 mm filer cut-off are used. Without wishing to be bound by theory, it is believed that a lower Rz, e.g., less than or equal to 0.75 μm, for example, less than or equal to 0.5 μm can play an important role in successful attachment, e.g., lamination of the multilayer polymeric film to another film, e.g., an optical film, such as a reflective polarizer film (e.g., a DBEF).

A method of making a multilayer polymeric film can include co-extruding the top layer, the inner layer, and the bottom layer. A single screw co-extrusion line can be used with a main extruder and two co-extruders. The extruders can include a vacuum vent, a screen changer, a melt pump, an adapter with a distributor bolt and a multilayer die. Any commercial film extrusion line system can prepare the multilayer films disclosed herein.

The extrusion can take place with polymeric material being entered into a first co-extruder, a second co-extruder, and a main extruder. The polymeric material will enter the barrel of each extruder through a feed throat and be heated until in a molten (flowing) state. Screws within the barrel of the extruder (e.g., single screw or twin-screws) will push the molten polymeric material out of the barrel exit and toward a die. The die can be a multi-manifold die configured to accept multiple extrudates from multiple extruders. The extrudes from each extruder can be combined within the die to form the multilayer polymeric film. After exiting the die, the formed multilayer polymeric film can pass through a calendaring system, for example, melt calendaring system to provide texture to a top surface of the top layer and a bottom surface of the bottom layer.

It is to be noted that the rollers are not limited in their material construction. The texturing on the multilayer film is replicated from the rollers. For example, surface texture of the top layer can come from a roller and surface texture of the bottom layer can come from another rollers. The rollers can be made from rubber or steel materials. Replication ratios of each roller can 80-95%.

As mentioned, once the multilayer film has been formed, the multilayer polymeric film can be attached to another article, e.g., another film or structure. For example, an outer surface (e.g., the bottom surface) of the bottom layer of the multilayer polymeric film can be directly laminated to another film. The bottom layer can be laminated to the other film without the use of an adhesive or adhesive layer, or any other layer or material therebetween. The lamination process comprises heating the bottom surface and the surface of the article to which the bottom surface is to attach to a temperature above the Tg of the bottom layer, for example, greater than or equal to 110° C., for example, greater than or equal to 120° C., for example, 130 to 170° C., orienting the surfaces to be attached adjacent to one another, and, once at temperature, applying pressure to adhere the multilayer film and the article together. Elimination of the need for an adhesive layer allows for direct attachment (e.g., lamination) to another article, which can assist in retaining or improving optical performance, while simplifying the manufacturing process and reducing overall cost.

For example, the multilayer film can be attached to another film such as an optical film (e.g., BEF, reflective polarizer film (DBEF), For example, in systems such as backlit and other display systems (e.g., reflective polarizer film (DBEF)), the multilayer film could replace the polycarbonate diffuser film and the adhesive layer. Individual polycarbonate diffuser films have been generally used to provide outermost surfaces (e.g., top and bottom), for example, in electronics and display products such as flat panel display applications. These polycarbonate films are attached with an adhesive. The use of an adhesive layer between a can be costly and can have a negative effect on light transmission and luminance performance of the optical film. The use of an adhesive layer can also increase the complexity of the process since the adhesive layer should be as thin as possible (e.g., less than or equal to 2 micrometers), so it can be difficult to control this thickness, making it not uniform across the film. Such variations in thickness can lead to light loss through the optical film. Accordingly, with the multilayer polymeric film disclosed herein, the use of an adhesive layer can be avoided without compromising the ability of the multilayer polymeric film to be attached to another film successfully, e.g., without bubbles or lines at the interface between the two films.

The multilayer polymeric film can be attached via a lamination process. The multilayer polymeric film can be attached on either or both sides of the optical film. The optical film can include a poly(ethylene terephthalate) film.

An article can be made from the multilayer polymeric film. The articles can be used in various applications such as UHD televisions, including thin film transistor LED UHD televisions. The articles can also be used in computer monitor/displays, HD televisions, billboards, projection displays, traffic signals, and other illuminated signs. An electronic display can include a light guide, an optical film surrounded on either or both sides with a multilayer polymeric film as described herein, an image producer (such as liquid crystal material, plasma, light emitting diodes, etc.) and a substrate disposed adjacent to the liquid crystal material.

The multilayer articles can be used as light diffusing films or sheets for flat panel displays, digital displays, windows, lighting covers, and other applications where both light diffusion effect and mechanical or abrasion resistance of the article are beneficial.

A more complete understanding of the components, processes, and apparatuses disclosed herein can be obtained by reference to the accompanying drawings. These figures (also referred to herein as "FIG.") are merely schematic representations based on convenience and the ease of demonstrating the present disclosure, and are, therefore, not intended to indicate relative size and dimensions of the devices or components thereof and/or to define or limit the scope of the exemplary embodiments. Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

In FIG. 1, a cross-section of a liquid crystal display 40 is shown. The liquid crystal display 40 includes liquid crystal material 44 surround on either side with a first substrate 42 and a second substrate 48. The first substrate 42 and the second substrate 48 can be made from glass or a polymeric material. A sealing material 46 can surround the liquid crystal material 44 to hold the liquid crystal material 44 in place. The sealing material 46 can include a polymeric resin, such as silicone, epoxies, ultraviolet light cured resins, etc. A spacer 58 can be present on either or both sides of the liquid crystal material 44. The outermost top surface of the liquid crystal display can be a first polarizing film 60 followed underneath (i.e., between the polarizing film 60 and the first substrate 42) by a first retardation film 62. The first retardation film 62 can be disposed adjacent to the first substrate 42. A second retardation film 64 can be disposed adjacent to the second substrate 48 with a second polarizing film 66 disposed adjacent to the second retardation film 64. An optical film 68 (e.g., a BEF, reflective polarizer film (DBEF), etc.) can be disposed between a polarizing separation film 50 and a diffusion film 24 with the polarizing separation film 50 being disposed adjacent to the second polarizing film 66. A light guide plate 54 can be located beneath a multilayer polymeric film 24 (e.g., a diffuser film 24) and a reflective sheet 56 disposed beneath the light guide plate 54. Although not shown in FIG. 1, it is to be understood that another multilayer polymeric film 24 can be located adjacent the other surface of the optical film 68 such that the optical film 68 is disposed between two multilayer polymeric films 24. A backlight 52 can be located next to the light guide plate 54 and the reflective sheet 56. The backlight 52 can include light emitting diodes (LED). The backlight 52 can include cold cathode fluorescent lighting (CCFL).

Figure 2:
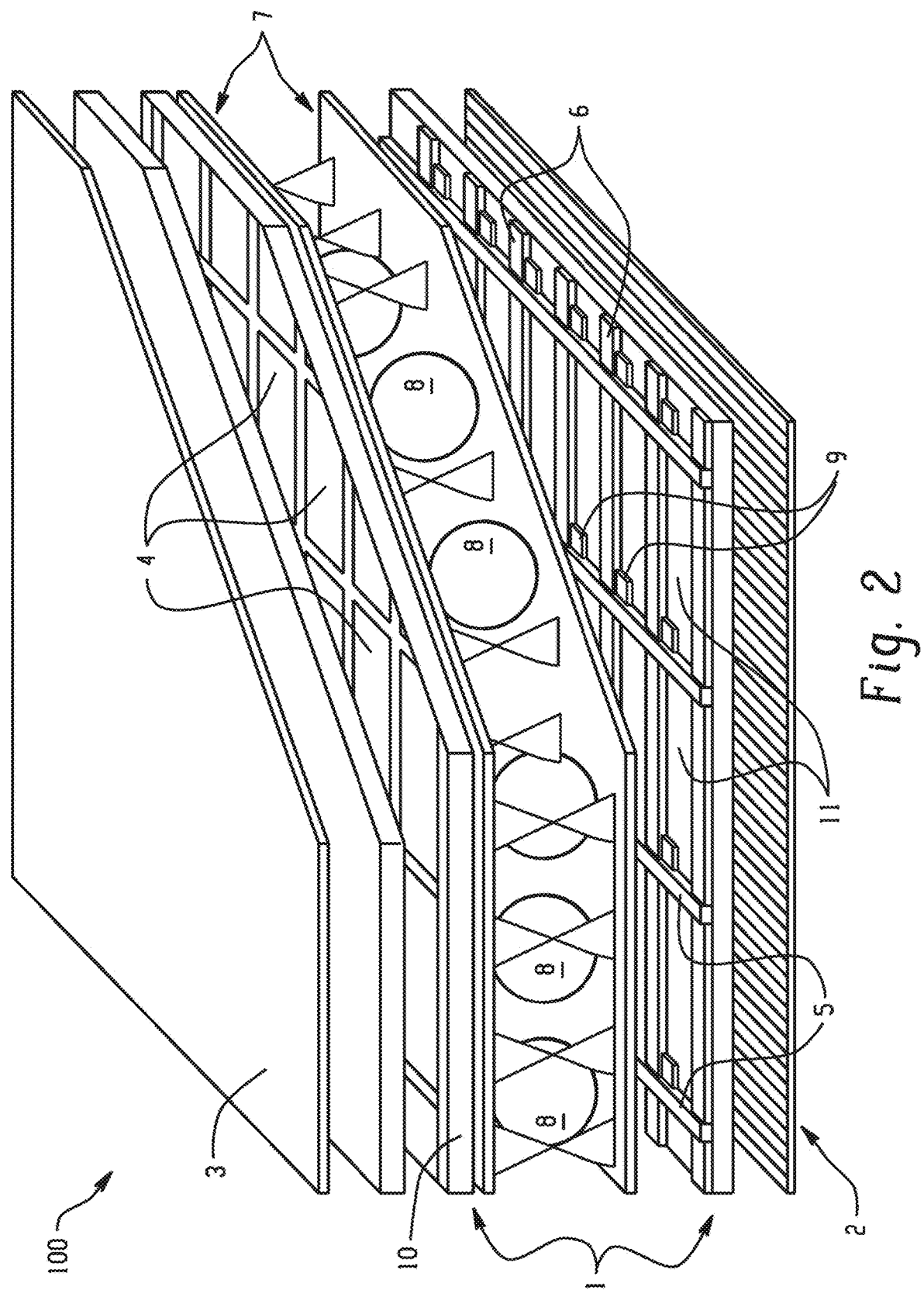
FIG. 2 is a cross-sectional view of a thin film transistor.

FIG. 2 is directed to thin film transistor (TFT) LCD technologies. A TFT LCD is a type of LCD that uses TFT technology to improve upon image qualities such as resolution and contrast. TFT LCDs can be used in appliances including television sets, computer monitors, mobile phones, handheld video game consoles, personal digital assistants, navigation systems, projections and appliances, such as refrigerators. A TFT is a field effect transistor (FET) made by depositing thin films of an active semiconductor layer, dielectric layer, and metallic contacts over a supporting, non-conducting substrate. The substrate can be glass or a polymeric material. In TFT LCDs, the transistors are embedded in the LCD panel itself, which reduces the amount of crosstalk between pixels, thereby improving image stability. A structure of a TFT-display is shown in FIG. 2. FIG. 2 does not include the actual light source (LED or CCFL).

As can be seen in FIG. 2, a TFT-display 100 includes substrates 1 where vertical 2 and horizontal 3 polarizers are the outermost surfaces of the TFT display 100. A color mask (e.g., a red green blue ("RGB") color mask) 4 can be located between the substrates 1. Spacers 8 can be disposed between polymer layers 7. Vertical 5 and horizontal 6 command lines can be located adjacent to TFTs 9. A front electrode 10 and a rear electrode 11 can be used to make contact with non-metallic parts of the TFT-display 100. Therefore, the TFT display 100 can be arranged as follows: the first polarizer, the first substrate, the color mask, the front electrode, the first polymer layer, the spacers, the second polymer layer, the rear electrode, the second substrate, and the second polarizer located at 90 degrees to the first polarizer. Also, between the second polymer layer and the rear electrode are the command lines 5, 6 and the TFT 9.

Turning now to FIGS. 3A and 3B, light output from an optical device with and without a BEF are shown. In FIG. 3A, no BEF is present. As can be seen, a reflected light beam 76 exits the screen toward the viewer, but there are several regions of wasted light 72, 74 that are outside the viewing angle. Additionally, it is noted that the reflected light beam 76 exiting the optical device 78 is not as bright as one exiting an optical device with a BEF due to the wasted light 72, 74. In FIG. 3B, a BEF 82 (see FIG. 3C) is present. As can be seen, a reflected light beam 77 exiting the optical device 80 is directed toward the viewer while reducing or eliminating the wasted light illustrated in FIG. 3A. As a result, it is noted that the light beam 77 exiting the optical device 80 is brighter as compared to the light beam 76. FIG. 3C demonstrates how a BEF 82 refracts, reflects, and recycles light beams toward the viewer so that a reduced amount of light is wasted. A backlight 84 with lamps 86 contained therein (the lamps can be LEDs, CCFLs, etc.) can direct light toward the BEF 82. The BEF 82 can refract light toward the viewer with refracted light beams 90. The BEF can recycle wasted off-axis light by reflecting the light back to the BEF 82 for recycling via recycling light beams 92. These beams 92 reflect off of reflective sheet 56, back through the BEF 82 toward the viewer. FIGS. 3B and 3C demonstrate the effectiveness of a BEF in enhancing and increasing the quality of light refracted, reflected, and recycled in an optical device.

FIGS. 4A and 4B show various light outputs from optical devices with and without a reflective polarizer film such as a DBEF 94. In FIG. 4A, a reflective polarizer film is not present. As seen in FIG. 4A, light is transmitted through the LCD 88 via a first polarized light beam 102 after exiting the backlight 84. The LCD can be surrounded with a first polarizer 96 and a second polarizer 98. The first and second polarizers 96, 98 can assist in reducing the amount of glare present in the outputted light to the viewer. The same amount of light (about 50%) is absorbed as transmitted before it reaches the LCD 88 via a second polarized light beam 104. In contrast, in FIG. 4B, a reflective polarizer film 94 is present with a multilayer polymeric film 24 disposed on either side of the reflective polarizer film 94. The multilayer optical film 24 can be a diffuser film. Light exiting the backlight 84 can be transmitted through the LCD 88 via the first polarized light beam 102 and the second polarized light beam 104, greatly reducing the amount of light absorbed by the LED as is the case without the presence of a reflective polarizer film. As shown in FIG. 4A, light from the lamps 86 is a type of electromagnetic wave. The light from the first polarized light beam 102 can pass through the second polarizer 98 and the first polarizer 96 and the light from the second polarized light beam 104 can be absorbed by the first polarizer 96. However, in FIG. 4B, if the reflective polarizer film 94 is added the reflective polarizer film 94 can reflect the light from the second polarized light beam 104 to the backlight 84 before the second polarizer 98 and the first polarizer 96 can absorb it, only letting light from the first polarized light beam 102 to pass through. The reflective polarizer film increases brightness and light output by reflecting and recycling the polarized light as shown in FIG. 4B by reflecting the light from the second polarized light beam 104 back to the backlight 84, where it is recycled and output as the bottom first polarized light beam 102 in FIG. 4B.

Figure 5:
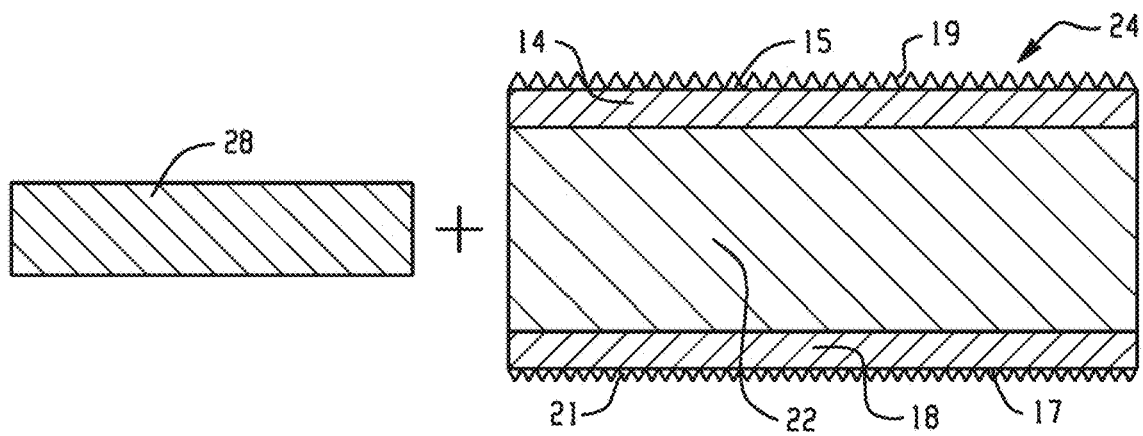
FIG. 5 is a view of an optical film and the various layers of a multilayer polymeric film before the two are attached to one another.

Turning now to FIG. 5, the structure for the multilayer polymeric film 24 is shown as well as an optical sheet 28 before the multilayer polymeric film 24 is attached. The multilayer polymeric film 24 comprises an inner layer 22 is disposed between and in direct physical contact with a top layer 14 and a bottom layer 18. The bottom layer 18 comprises a bottom surface (outer surface) 17 with a fine texture 21 illustrated therein. The top layer 14 comprises a top surface (outer surface) 15 comprising optional microstructure elements 19 therein.

Figure 6:
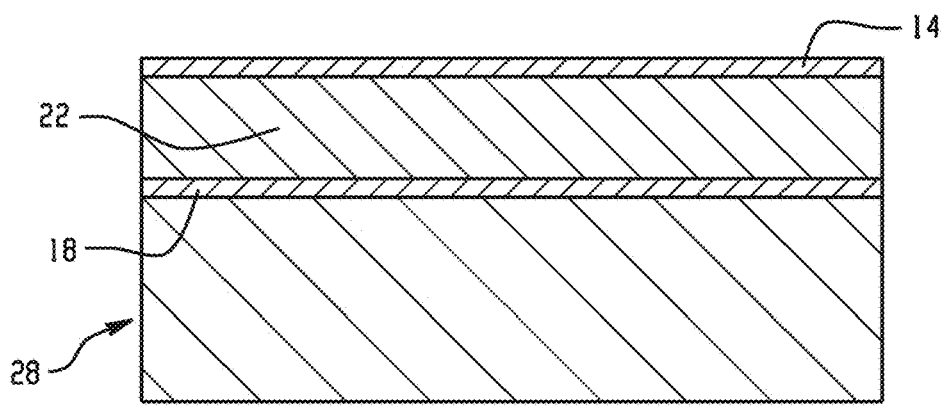
FIG. 6 is a view of a multilayer polymeric film attached to an optical film.
Figure 7:
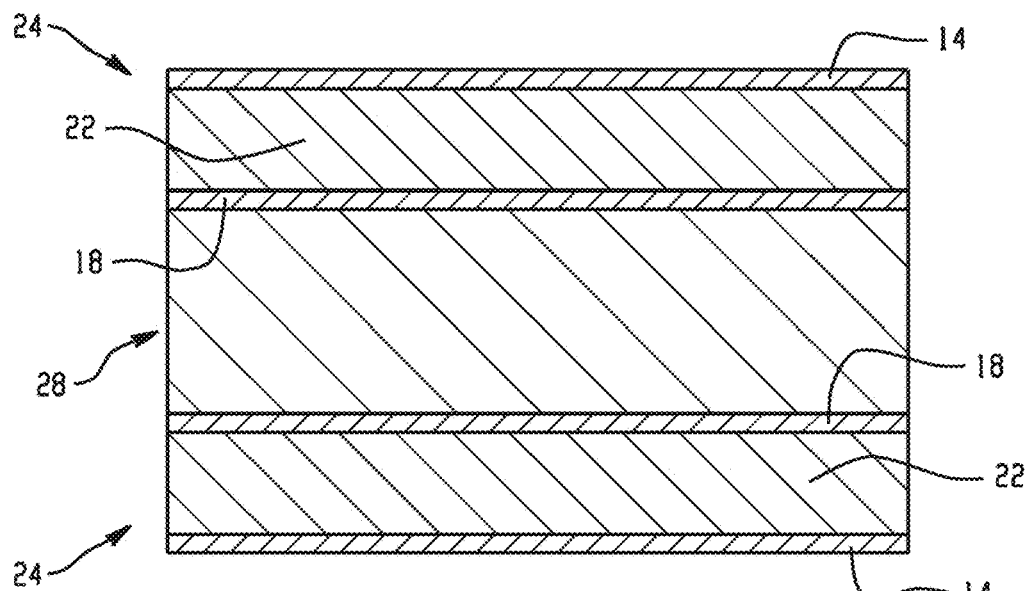
FIG. 7 is a view of two multilayer polymeric films attached to an optical film.

The multilayer polymeric film 24 can be attached, e.g., via a lamination process, to either or both sides of the optical film 28. FIG. 6 demonstrates the optical film 28 with the multilayer polymeric film 24 attached on one surface of the optical film 28. FIG. 7 demonstrates the optical film 28 with the multilayer polymeric film 24 attached on both surfaces of the optical film 28.

Figure 8:
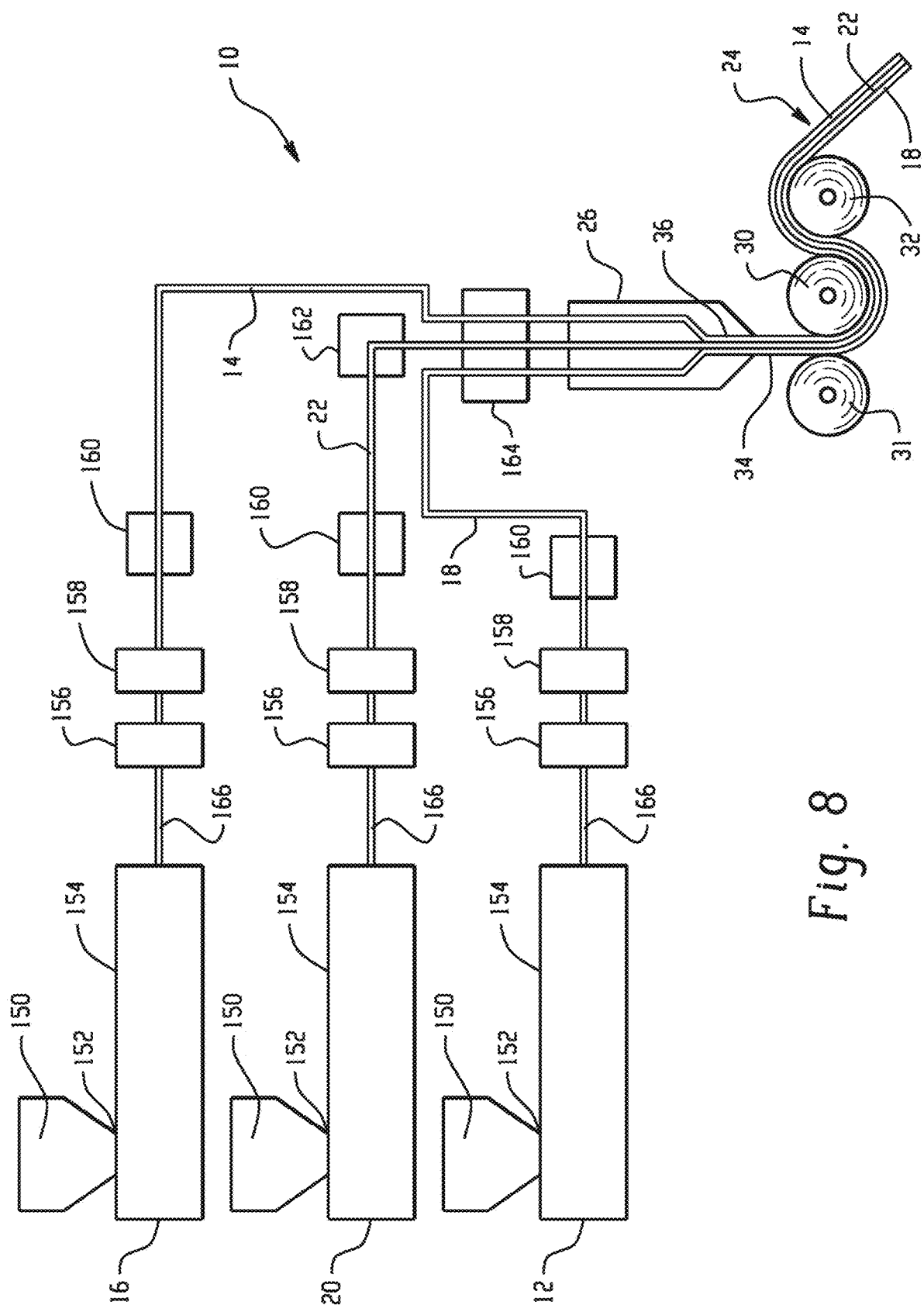
FIG. 8 is a schematic depiction of an extruder configuration used to make the multilayer polymer films disclosed herein.

Turning now to FIG. 8 an extruder configuration 10 to make a multilayer polymeric film 24 is shown. In FIG. 8, a first co-extruder 16 is used to extrude the top layer 14. A second co-extruder 12 is used to extrude the bottom layer 18. A main extruder 20 is used to extrude the inner layer 22. It is to be understood that the first co-extruder 12 and the second co-extruder 16 can make either of the top layer 14 or the bottom layer 18. The top layer 14, the bottom layer 18, and the inner layer 22 can be passed through a multi-manifold co-extrusion die 26 to form a multilayer polymeric film 24.

Texturing can be applied to the top layer 14 and to the bottom layer 18 via cylindrical rollers 30, 31, 32. Texturing can be applied to a top surface 15 of the top layer 14 and to a bottom surface 17 of the bottom layer 18. The texturing can be attained using various methods such as calendaring, embossing, and others, as well as combinations comprising at least one of the foregoing. Some techniques, systems, and tools for texturing are disclosed, for example, in U.S. Pat. No. 7,889,427 to Bastawros et al. which is incorporated by reference herein in its entirety.

In a method of making the multilayer sheet 24, polymeric material in the form of pellets, granules, flakes or powder are placed in the hoppers 150 of each respective extruder 12, 16, 20. The polymeric material enters a barrel 154 of each extruder through a feed through 152. While in the barrel 154, the polymeric material is heated to a molten state with a heating elements and screw elements located within the barrel 154 and pushed through the barrel 154 with screw elements also located within the barrel 154. The screw elements can be rotated within the barrel up to 120 revolutions per minute (rpm).

Any desired range of screw rotation can be used depending on the size of the extruder, the length to diameter ratio (L/D) of the screw, along with any desired pressure inside the barrel. A single screw extruder can be used to make the optical film due to the low shear force imparted to the material. The co-extruders used are generally smaller than the main extruder, which is used to provide the inner layer. The molten extrude 166 exits the barrel 154 of each of the extruders 12, 16, 20 and passes through a screen changer/breaker plate assembly 156 to remove any contaminates from the extrude 166. The screen changer can be reinforced by the breaker plate, which can be a metal puck with many holes therethrough. The screen changer/breaker plate assembly 156 can create back pressure in the barrel 154. Back pressure assists in uniform melting and proper mixing of the polymeric material. The back pressure can be varied based on varying screen changer composition, for example, the number of screens, the wire weave size within the screens, among other parameters.

After passing through the screen changer/breaker plate assembly 156, the extrude 166 can pass through a gear pump 158, after which the extrude 166 passes through a connection piece and then the extrude 166 from each of the three extruders enters the multi-manifold co-extrusion die 26, for example a coat hanger shaped die. Optionally, the extrude 166 from the main extruder 20 (i.e., the inner layer 22) can pass through a corner piece before entering an adaptor plate 164 and finally, the multi-manifold co-extrusion die 26. The top layer 14, the bottom layer 18, and the inner layer 22 are combined with the multi-manifold co-extrusion die 26 to form the multilayer polymeric film 24. The die is the piece of equipment that gives the film its final shape. The die should be shaped accordingly so that the molten polymeric material flows evenly throughout and exits the die as the final shaped article. After exiting the multi-manifold co-extrusion die 24, the multilayer polymeric film 24 passes to a melt calendaring system to apply texture to a top surface 15 of the top layer 14 (see FIG. 5) and a bottom surface 17 of the bottom layer 18 (see FIG. 5).

Figure 9:
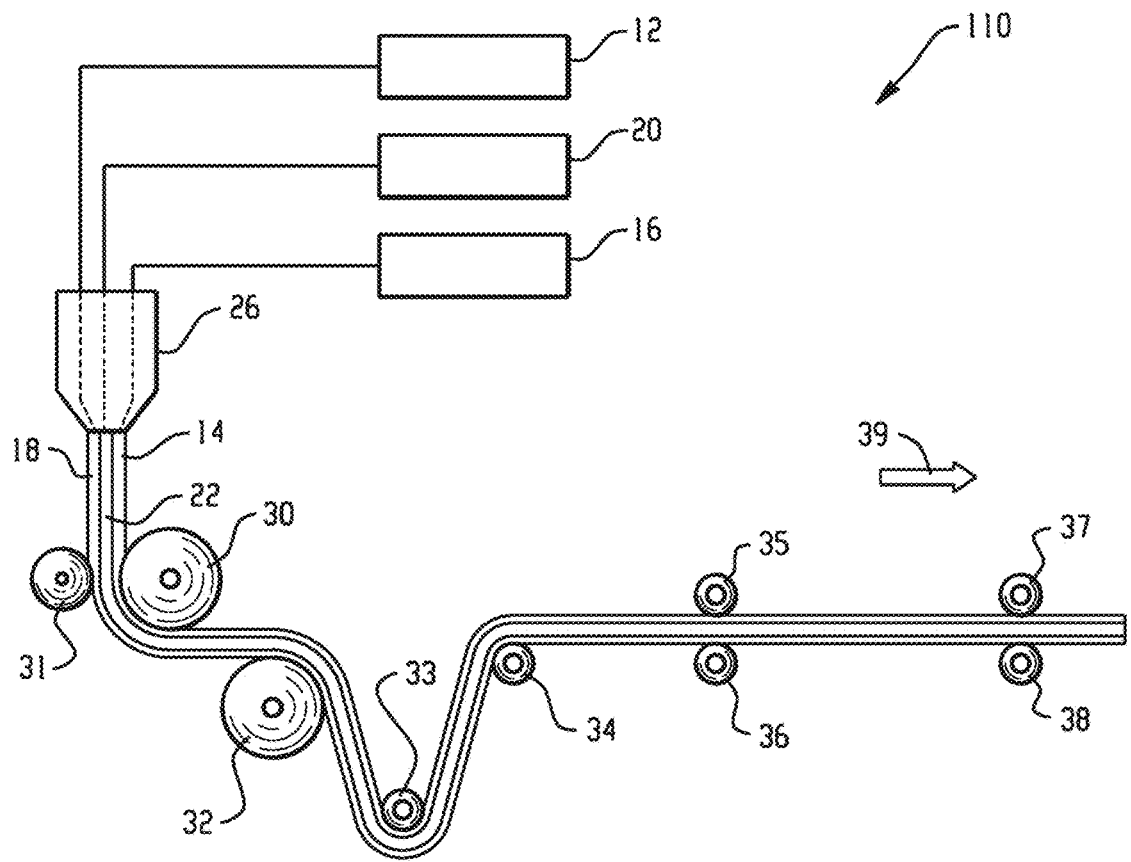
FIG. 9 is a schematic of a melt calendaring system for manufacturing a multilayer polymeric film.
Figure 10:
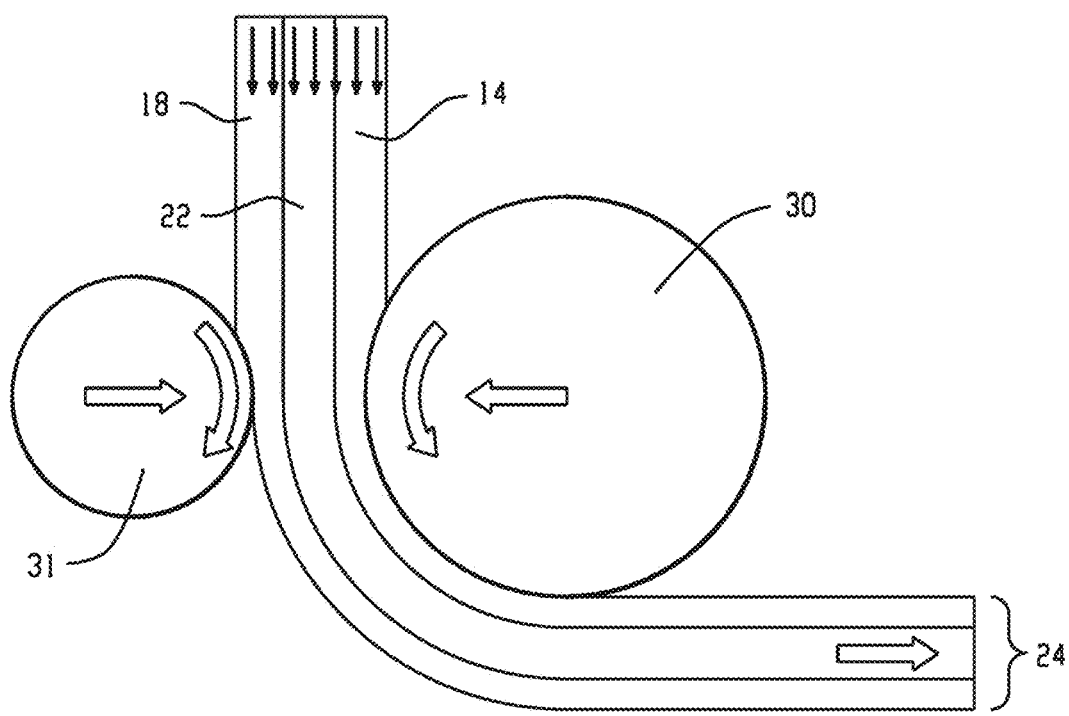
FIG. 10 is a detailed view of certain elements of the calendaring system of FIG. 10.

An exemplary melt calendaring system 110 for manufacturing a textured multilayer polymeric film 24 is shown in FIGS. 9 and 10. The top layer 14 is in contact with a master roller 30 that carries the primary surface texture of the top layer 14.

As shown in FIG. 9, the melt calendaring system 110 includes three extruders 12, 16, 20, which extrude different polymeric materials for the top layer 14, the inner layer 22, and the bottom layer 18, a multi-manifold co-extrusion die 26, cylindrical rollers 30, 31, 32, 33, 34, 35, 36, 37, 38 where the rollers 30 and 31 are the first calendaring nip rollers, and the roller 30 carries the primary surface texture pattern of the top layer 14 and the roller 31 carries the surface texture patter of the bottom layer 18.

The extruders 12, 16, 20 can heat the polymeric components above a predetermined temperature to induce the components to flow (e.g., molten plastic). The outputs of the extruders are operably coupled to the multi-manifold co-extrusion die 26 through speed setting of gear pump. The die 26 can be a vertical die. The die 26 can be a horizontal die.

Cylindrical rollers 30, 31 are provided to receive multilayer molten web therebetween from the die 26, and can form a primary surface texture onto the top surface 36 (see FIG. 8) of the top layer 14 of the multilayer polymeric film 24 under a nip pressure between cylindrical rollers 30, 31, and also cool the textured molten web to a textured solid web. Cylindrical rollers 30, 31 can be constructed from metal (e.g., steel) with rubber or steel surface layer surrounding a metal roller core and are operably coupled to a roller cooling system. The roller cooling system maintains a temperature of rollers 30, 31 below a predetermined temperature to solidify or partially solidify the multilayer molten polymer web as it passes between cylindrical rollers 30, 31. The cylindrical roller 31 is configured to receive the multilayer polymeric web therebetween from the die 26 and can form the surface texture onto the bottom surface 34 of the bottom layer 18.

To make of an optical film with a structured texture such as the one comprising a plurality of linear prisms or microlens, a high nip pressure (e.g., >10 bars) between the first calendaring rollers 30, 31 is generally applied to ensure that the texture replication from the master roller to the surface of the film is efficient and also uniform across the web width. Nip pressure is not needed between rollers 30 and 32.

Cylindrical roller 32 is configured to receive partially solidified plastic web after passing between calendaring nip rollers 30, 31. The position of cylindrical roller 32 can be adjusted to vary an amount of surface area that the top layer 14 and the bottom layer 18 contact the cylindrical roller 30. The cylindrical roller 32 is also operably coupled to the roller cooling system (not shown) that maintains the temperature of the cylindrical roller 32 below a predetermined temperature for solidifying the multilayer polymeric film. The cylindrical roller 32 can be driven by a motor (instead of relying on the friction between the web and the surface of the cylindrical roller 32) to rotate in order to minimize the web tension that can be applied to the partially solidified layers 14, 18, 22 along a machine direction 39. The cylindrical rollers 33 through 38 are conveying rollers downstream, where rollers 35, 36, 37, and 38 are provided to receive the layers 14, 18, 22 therebetween and to move the layers 14, 18, 22 downstream.

The speeds of the various rollers as the film travels through the calendaring system can be dependent upon output and film thickness, which can be 10-60 meters per minute. The nip pressure between roller 30 and roller 31 can depend on the cosmetic makeup of the film and other properties of the film such as roughness and transmission. Nip pressure can be less than or equal to 10 MegaPascal (Mpa) (100 bar). The Ra of roller 31 is generally higher than the desired Ra of resulting surface 17, while the Ra of roller 30 is generally higher than resulting surface 15. It is to be noted, however, that the Ra can be any value that will give the desired surface roughness to the film produced. Each roller 30, 31, 32 can have their own motors to drive rotation. Each roller 30, 31, 32 can be pre-heated by a temperature control unit that uses water separately as a cooling and heating media, before the extrusion line begins. Other methods can be used to provide the textured surfaces including, but not limited to mechanical and chemical processes, such as laser, sanding, blasting, diamond engraving, etc.

"Polycarbonate" as used herein means a polymer or copolymer having repeating structural carbonate units of formula (1)

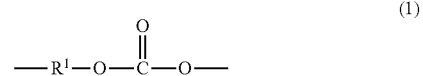

(1)

wherein at least 60 percent of the total number of $R^1$ groups are aromatic, or each $R^1$ contains at least one $C_{6\text{-}30}$ aromatic group. Each $R^1$ can be derived from a dihydroxy compound such as an aromatic dihydroxy compound of formula (2) or a bisphenol of formula (3).

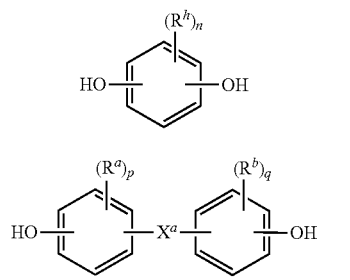

In formula (2), each $R^h$ is independently a halogen atom, for example bromine, a $C_{1-10}$ hydrocarbyl group such as a $C_{1-10}$ alkyl, a halogen-substituted $C_{1-10}$ alkyl, a $C_{6-10}$ aryl, or a halogen-substituted $C_{6-10}$ aryl, and n is 0 to 4.

In formula (3), $R^a$ and $R^b$ are each independently a halogen, $C_{1-12}$ alkoxy, or $C_{1-12}$ alkyl, and p and q are each independently integers of 0 to 4, such that when p or q is less than 4, the valence of each carbon of the ring is filled by hydrogen. In an embodiment, p and q is each 0, or p and q is each 1, and $R^a$ and $R^b$ are each a $C_{1-3}$ alkyl group, for example, methyl, disposed meta to the hydroxy group on each arylene group. $X^a$ is a bridging group connecting the two hydroxy-substituted aromatic groups, where the bridging group and the hydroxy substituent of each $C_6$ arylene group are disposed ortho, meta, or para (e.g., para) to each other on the $C_6$ arylene group, for example, a single bond, —O—, —S—, —S(O)—, —S(O)$_2$—, —C(O)—, or a $C_{1-18}$ organic group, which can be cyclic or acyclic, aromatic or non-aromatic, and can further comprise heteroatoms such as halogens, oxygen, nitrogen, sulfur, silicon, or phosphorous. For example, $X^a$ can be a substituted or unsubstituted $C_{3-18}$ cycloalkylidene; a $C_{1-25}$ alkylidene of the formula —C($R^c$)($R^d$)— wherein $R^c$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl; or a group of the formula —C(=$R^e$)— wherein $R^e$ is a divalent $C_{1-12}$ hydrocarbon group.

Examples of bisphenol compounds include 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl)phenylmethane, 2,2-bis(4-hydroxy-3-bromophenyl)propane, 1,1-bis (hydroxyphenyl)cyclopentane, 1,1-bis(4-hydroxyphenyl)cyclohexane, 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantane, alpha,alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl) fluorene, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalimide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole; resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like.

Dihydroxy compounds include resorcinol, 2,2-bis(4-hydroxyphenyl) propane ("bisphenol A" or "BPA"), 3,3-bis(4-hydroxyphenyl) phthalimidine, 2-phenyl-3,3'-bis(4-hydroxyphenyl) phthalimidine (also known as N-phenyl phenolphthalein bisphenol, "PPPBP", or 3,3-bis(4-hydroxyphenyl)-2-phenylisoindolin-1-one), 1,1-bis(4-hydroxy-3-methylphenyl)cyclohexane, and 1,1-bis(4-hydroxyphenyl)-3,3,5-trimethylcyclohexane (isophorone bisphenol).

"Polycarbonate" as used herein also includes copolymers comprising carbonate units and ester units ("poly(ester-carbonate)s", also known as polyester-polycarbonates). Poly(ester-carbonate)s further contain, in addition to recurring carbonate chain units of formula (1), repeating ester units of formula (4)

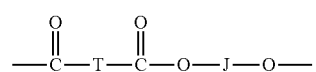

wherein J is a divalent group derived from a dihydroxy compound (which includes a reactive derivative thereof), and can be, for example, a $C_{2-10}$ alkylene, a $C_{6-20}$ cycloalkylene a $C_{6-20}$ arylene, or a polyoxyalkylene group in which the alkylene groups contain 2 to 6 carbon atoms, for example, 2, 3, or 4 carbon atoms; and T is a divalent group derived from a dicarboxylic acid (which includes a reactive derivative thereof), and can be, for example, a $C_{2-20}$ alkylene, a $C_{6-20}$ cycloalkylene, or a $C_{6-20}$ arylene. Copolyesters containing a combination of different T or J groups can be used. The polyester units can be branched or linear.

Dihydroxy compounds include aromatic dihydroxy compounds of formula (2) (e.g., resorcinol), bisphenols of formula (3) (e.g., bisphenol A), a $C_{1-8}$ aliphatic diol such as ethane diol, n-propane diol, i-propane diol, 1,4-butane diol, 1,6-cyclohexane diol, 1,6-hydroxymethylcyclohexane, or a combination comprising at least one of the foregoing dihydroxy compounds. Aliphatic dicarboxylic acids that can be used include $C_{6-20}$ aliphatic dicarboxylic acids (which includes the terminal carboxyl groups), e.g., linear $C_{8-12}$ aliphatic dicarboxylic acid such as decanedioic acid (sebacic acid); and alpha, omega-$C_{12}$ dicarboxylic acids such as dodecanedioic acid (DDDA). Aromatic dicarboxylic acids that can be used include terephthalic acid, isophthalic acid, naphthalene dicarboxylic acid, 1,6-cyclohexane dicarboxylic acid, or a combination comprising at least one of the foregoing acids. A combination of isophthalic acid and terephthalic acid wherein the weight ratio of isophthalic acid to terephthalic acid is 91:9 to 2:98 can be used.

Ester units include ethylene terephthalate units, n-propylene terephthalate units, n-butylene terephthalate units, ester units derived from isophthalic acid, terephthalic acid, and resorcinol (ITR ester units), and ester units derived from sebacic acid and bisphenol A. The molar ratio of ester units to carbonate units in the poly(ester-carbonate)s can vary broadly, for example 1:99 to 99:1, for example, 10:90 to 90:10, for example, 25:75 to 75:25, or from 2:98 to 15:85. In some embodiments the molar ratio of ester units to carbonate units in the poly(ester-carbonate)s can vary from 1:99 to 30:70, for example, 2:98 to 25:75, for example, 3:97 to 20:80, or from 5:95 to 15:85.

In an embodiment, the polycarbonate is a linear homopolymer containing bisphenol A carbonate units (BPA-PC), commercially available under the trade name LEXAN™ from SABIC; or a branched, cyanophenol end-capped bisphenol A homopolycarbonate produced via interfacial polymerization, containing 3 mol % 1,1,1-tris(4-hydroxyphenyl)ethane (THPE) branching agent, commercially available under the trade name LEXAN™ CFR from SABIC.

Other polycarbonates that can be used include poly(aromatic ester-carbonate)s comprising bisphenol A carbonate units and isophthalate-terephthalate-bisphenol A ester units, also commonly referred to as poly(carbonate-ester)s (PCE) or poly(phthalate-carbonate)s (PPC), depending on the relative ratio of carbonate units and ester units. Another poly(ester-carbonate) comprises resorcinol isophthalate and terephthalate units and bisphenol A carbonate units, such as those commercially available under the trade name LEXAN™ SLX from SABIC.

Other polycarbonates that can be used include poly(ester-carbonate-siloxane)s comprising bisphenol A carbonate units, isophthalate-terephthalate-bisphenol A ester units, and siloxane units, for example blocks containing 5 to 200 dimethylsiloxane units, such as those commercially available under the trade name FST from SABIC.

Poly(aliphatic ester-carbonate)s can be used, such as those comprising bisphenol A carbonate units and sebacic acid-bisphenol A ester units, such as those commercially available under the trade name LEXAN™ HFD from SABIC.

A copolycarbonate includes bisphenol A and bulky bisphenol carbonate units, i.e., derived from bisphenols containing at least 12 carbon atoms, for example 12 to 60 carbon atoms or 20 to 40 carbon atoms. Examples of such copolycarbonates include copolycarbonates comprising bisphenol A carbonate units and 2-phenyl-3,3'-bis(4-hydroxyphenyl) phthalimidine carbonate units (a BPA-PPPBP copolymer, commercially available under the trade name XHT from SABIC), a copolymer comprising bisphenol A carbonate units and 1,1-bis(4-hydroxy-3-methylphenyl)cyclohexane carbonate units (a BPA-DMBPC copolymer commercially available under the trade name DMC from SABIC), and a copolymer comprising bisphenol A carbonate units and isophorone bisphenol carbonate units (available, for example, under the trade name APEC from Bayer).

Combinations of polycarbonates with other polymers can be used, for example an alloy of bisphenol A polycarbonate with an ester such as poly(butylene terephalate) or poly (ethylene terephthalate), each of which can be semicrystalline or amorphous. Such combinations are commercially available under the trade name XENOY and XYLEX from SABIC.

"Polycarbonates" includes homopolycarbonates (wherein each $R^1$ in the polymer is the same), copolymers comprising different $R^1$ moieties in the carbonate ("copolycarbonates"), and copolymers comprising carbonate units and other types of polymer units, such as ester units or siloxane units.

A type of copolymer is a poly(ester-carbonate), also known as a polyester-polycarbonate. Such copolymers further contain, in addition to recurring carbonate units of formula (1), repeating units of formula (5)

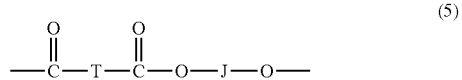

wherein J is a divalent group derived from a dihydroxy compound (including a reactive derivative thereof), and can be, for example, a $C_{2-10}$ alkylene, a $C_{6-20}$ cycloalkylene, a $C_{6-20}$ arylene, or a polyoxyalkylene in which the alkylene groups contain 2 to 6 carbon atoms, for example, 2, 3, or 4 carbon atoms; and T is a divalent group derived from a dicarboxylic acid (including a reactive derivative thereof), and can be, for example, a $C_{2-20}$ alkylene, a $C_{6-20}$ cycloalkylene, or a $C_{6-20}$ arylene. Copolyesters containing a combination of different T or J groups can be used. The polyester units can be branched or linear.

In an embodiment, J is a $C_{2-30}$ alkylene group having a straight chain, branched chain, or cyclic (including polycyclic) structure, for example ethylene, n-propylene, i-propylene, 1,4-butylene, 1,6-cyclohexylene, or 1,4-methylenecyclohexane. In another embodiment, J is derived from a bisphenol of formula (3), e.g., bisphenol A. In another embodiment, J is derived from an aromatic dihydroxy compound of formula (6), e.g, resorcinol.

Aromatic dicarboxylic acids that can be used to prepare the polyester units include isophthalic or terephthalic acid, 1,2-di(p-carboxyphenyl)ethane, 4,4'-dicarboxydiphenyl ether, 4,4'-bisbenzoic acid, or a combination comprising at least one of the foregoing acids. Acids containing fused rings can also be present, such as in 1,4-, 1,5-, or 2,6-naphthalenedicarboxylic acids. Dicarboxylic acids include terephthalic acid, isophthalic acid, naphthalene dicarboxylic acid, 1,4-cyclohexane dicarboxylic acid, or a combination comprising at least one of the foregoing acids. A dicarboxylic acid comprises a combination of isophthalic acid and terephthalic acid wherein the weight ratio of isophthalic acid to terephthalic acid is 91:9 to 2:98.

Ester units include ethylene terephthalate, n-propylene terephthalate, n-butylene terephthalate, 1,4-cyclohexanedimethylene terephthalate, and ester units derived from isophthalic acid, terephthalic acid, and resorcinol (ITR)). The molar ratio of ester units to carbonate units in the copolymers can vary broadly, for example 1:99 to 99:1, for example, 10:90 to 90:10, for example, 25:75 to 75:25, or 2:98 to 15:85, depending on the desired properties of the final composition. Poly(ester-carbonate)s are those including bisphenol A carbonate units and isophthalate-terephthalate-bisphenol A ester units, also commonly referred to as poly(carbonate-ester)s (PCE) poly(phthalate-carbonate)s (PPC) depending on the molar ratio of carbonate units and ester units.

An example of a poly(ester-carbonate) is a poly(aliphatic ester-carbonate derived from a linear $C_{6-20}$ aliphatic dicarboxylic acid (which includes a reactive derivative thereof), for example, a linear $C_6$-$C_{12}$ aliphatic dicarboxylic acid (which includes a reactive derivative thereof). Dicarboxylic acids include n-hexanedioic acid (adipic acid), n-decanedioic acid (sebacic acid), and alpha, omega-$C_{12}$ dicarboxylic acids such as dodecanedioic acid (DDDA). A poly(aliphatic ester)-polycarbonate is of formula (6):

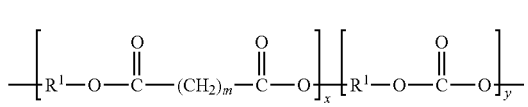

(6)

wherein each $R^1$ can be the same or different, and is as described in formula (1), m is 4 to 18, for example, 4 to 10, and the average molar ratio of ester units to carbonate units x:y is 99:1 to 1:99, including 13:87 to 2:98, or 9:91 to 2:98, or 8:92 to 2:98. In an embodiment, the poly(aliphatic ester)-polycarbonate copolymer comprises bisphenol A sebacate ester units and bisphenol A carbonate units, having, for example an average molar ratio of x:y of 2:98 to 8:92, for example 6:94. Such poly(aliphatic ester-carbonate)s are commercially available as LEXAN HFD from SABIC (LEXAN is a trademark of SABIC IP B.V.).

The poly(aliphatic ester-carbonate) can have a weight average molecular weight of 15,000 to 40,000 Dalton (Da), including 20,000 to 38,000 Da (measured by GPC based on BPA polycarbonate standards).

Polycarbonates can be manufactured by processes such as interfacial polymerization and melt polymerization, which are known, and are described, for example, in WO 2013/175448 A1 and WO 2014/072923 A1. An end-capping agent (also referred to as a chain stopper agent or chain terminating agent) can be included during polymerization to provide end groups, for example monocyclic phenols such as phenol, p-cyanophenol, and $C_1$-$C_{22}$ alkyl-substituted phenols such as p-cumyl-phenol, resorcinol monobenzoate, and p- and tertiary-butyl phenol, monoethers of diphenols, such as p-methoxyphenol, monoesters of diphenols such as resorcinol monobenzoate, functionalized chlorides of aliphatic monocarboxylic acids such as acryloyl chloride and methacryoyl chloride, and mono-chloroformates such as phenyl chloroformate, alkyl-substituted phenyl chloroformates, p-cumyl phenyl chloroformate, and toluene chloroformate. Combinations of different end groups can be used. Branched polycarbonate blocks can be prepared by adding a branching agent during polymerization, for example trimellitic acid, trimellitic anhydride, trimellitic trichloride, tris-p-hydroxyphenylethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl) alpha, alpha-dimethyl benzyl)phenol), 4-chloroformyl phthalic anhydride, trimesic acid, and benzophenone tetracarboxylic acid. The branching agents can be added at a level of 0.05 to 2.0 wt. %. Combinations comprising linear polycarbonates and branched polycarbonates can be used.

Exemplary carbonate precursors include a carbonyl halide such as carbonyl bromide or carbonyl chloride (phosgene) a bishaloformate of a dihydroxy compound (e.g., the bischloroformate of bisphenol A, hydroquinone ethylene glycol, neopentyl glycol, or the like), and diaryl carbonates. Combinations comprising at least one of the foregoing types of carbonate precursors can also be used. The diaryl carbonate ester can be diphenyl carbonate, or an activated diphenyl carbonate having electron-withdrawing substituents on the each aryl, such as bis(4-nitrophenyl)carbonate, bis(2-chlorophenyl)carbonate, bis(4-chlorophenyl)carbonate, bis(methyl salicyl)carbonate, bis(4-methylcarboxylphenyl) carbonate, bis(2-acetylphenyl) carboxylate, bis(4-acetylphenyl) carboxylate, or a combination comprising at least one of the foregoing.

In the manufacture of poly(ester-carbonate)s by interfacial polymerization, rather than using the dicarboxylic acid or diol directly, the reactive derivatives of the diacid or diol, such as the corresponding acid halides, in particular the acid dichlorides and the acid dibromides can be used. Thus, for example instead of using isophthalic acid, terephthalic acid, or a combination comprising at least one of the foregoing acids, isophthaloyl dichloride, terephthaloyl dichloride, or a combination comprising at least one of the foregoing dichlorides can be used.

In addition to the polycarbonates described above, combinations of the polycarbonate with other thermoplastic polymers, for example combinations of homopolycarbonates, copolycarbonates, and polycarbonate copolymers with polyesters, can be used. Useful polyesters include, for example, polyesters having repeating units of formula (7), which include poly(alkylene dicarboxylates), liquid crystalline polyesters, and polyester copolymers. The polyesters described herein are generally completely miscible with the polycarbonates when blended.

The polyesters can be obtained by interfacial polymerization or melt-process condensation as described above, by solution phase condensation, or by transesterification polymerization wherein, for example, a dialkyl ester such as dimethyl terephthalate can be transesterified with ethylene glycol using acid catalysis, to generate poly(ethylene terephthalate). A branched polyester, in which a branching agent, for example, a glycol having three or more hydroxyl groups or a trifunctional or multifunctional carboxylic acid has been incorporated, can be used. Furthermore, it can be desirable to have various concentrations of acid and hydroxyl end groups on the polyester, depending on the ultimate end use of the composition.

Copolymers comprising alkylene terephthalate repeating ester units with other ester groups can also be useful. Useful ester units can include different alkylene terephthalate units, which can be present in the polymer chain as individual units, or as blocks of poly(alkylene terephthalates). Copolymers of this type include poly(cyclohexanedimethylene terephthalate)-co-poly(ethylene terephthalate), abbreviated as PETG where the polymer comprises greater than or equal to 50 mol % of poly(ethylene terephthalate), and abbreviated as PCTG where the polymer comprises greater than 50 mol % of poly(1,4-cyclohexanedimethylene terephthalate).

Poly(cycloalkylene diester)s can also include poly(alkylene cyclohexanedicarboxylate)s. Of these, an example is poly(1,4-cyclohexane-dimethanol-1,4-cyclohexanedicarboxylate) (PCCD), having recurring units of formula (7)

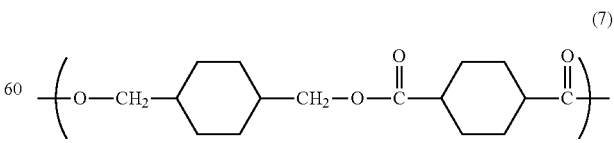

(7)

wherein, as described using formula (5), J is a 1,4-cyclohexanedimethylene group derived from 1,4-cyclohexanedimethanol, and T is a cyclohexane ring derived from cyclohexanedicarboxylate or a chemical equivalent thereof, and can comprise the cis-isomer, the trans-isomer, or a combination comprising at least one of the foregoing isomers.

It is desirable for such a polyester and polycarbonate blend to have an MVR of 5 to 150 cc/10 min, for example, 7 to 125 cc/10 min, for example, 9 to 110 cc/10 min, and for example, 10 to 100 cc/10 min, measured at 300° C. and a load of 1.2 kilograms according to ASTM D1238-04.

The thermoplastic composition can further include an impact modifier. Examples of impact modifiers include natural rubber, fluoroelastomers, ethylene-propylene rubber (EPR), ethylene-butene rubber, ethylene-propylene-diene monomer rubber (EPDM), acrylate rubbers, hydrogenated nitrile rubber (HNBR), silicone elastomers, styrene-butadiene-styrene (SBS), styrene-butadiene rubber (SBR), styrene-(ethylene-butene)-styrene (SEBS), acrylonitrile-butadiene-styrene (ABS), acrylonitrile-ethylene-propylene-diene-styrene (AES), styrene-isoprene-styrene (SIS), styrene-(ethylene-propylene)-styrene (SEPS), methyl methacrylate-butadiene-styrene (MBS), high rubber graft (HRG), and the like.

An additive composition can be used, comprising one or more additives selected to achieve a desired property, with the proviso that the additive(s) are also selected so as to not significantly adversely affect a desired property of the thermoplastic composition. The additive composition or individual additives can be mixed at a suitable time during the mixing of the components for forming the composition. The additive can be soluble or non-soluble in polycarbonate. The additive composition can include an impact modifier, flow modifier, filler (e.g., a particulate polytetrafluoroethylene (PTFE), glass, carbon, mineral, or metal), reinforcing agent (e.g., glass fibers), antioxidant, heat stabilizer, light stabilizer, ultraviolet (UV) light stabilizer, UV absorbing additive, plasticizer, lubricant, release agent (such as a mold release agent), antistatic agent, anti-fog agent, antimicrobial agent, colorant (e.g, a dye or pigment), surface effect additive, radiation stabilizer, flame retardant, anti-drip agent (e.g., a PTFE-encapsulated styrene-acrylonitrile copolymer (TSAN)), or a combination comprising one or more of the foregoing. For example, a combination of a heat stabilizer, mold release agent, and ultraviolet light stabilizer can be used. In general, the additives are used in the amounts generally known to be effective. For example, the total amount of the additive composition (other than any impact modifier, filler, or reinforcing agent) can be 0.001 to 10.0 wt %, or 0.01 to 5 wt %, each based on the total weight of the polymer in the composition.

The polycarbonate compositions can be manufactured by various methods known in the art. For example, powdered polycarbonate, and other optional components are first blended, optionally with any fillers, in a high-speed mixer or by hand mixing. The blend is then fed into the throat of a twin-screw extruder via a hopper. Alternatively, at least one of the components can be incorporated into the composition by feeding it directly into the extruder at the throat or downstream through a sidestuffer, or by being compounded into a masterbatch with a desired polymer and fed into the extruder. The extruder is generally operated at a temperature higher than that necessary to cause the composition to flow. The extrude can be immediately quenched in a water bath and pelletized. The pellets so prepared can be one-fourth inch long or less as desired. Such pellets can be used for subsequent molding, shaping, or forming.

The thermoplastic compositions can be manufactured by various methods. For example, powdered polycarbonate, impact modifier, ultraviolet light stabilizer, or other optional components are first blended, optionally with fillers in a HENSCHEL-Mixer® high speed mixer. Other low shear processes, including but not limited to hand mixing, can also accomplish this blending. The blend is then fed into the throat of a twin-screw extruder via a hopper. Alternatively, at least one of the components can be incorporated into the composition by feeding directly into the extruder at the throat or downstream through a sidestuffer. Additives can also be compounded into a masterbatch with a desired polymeric polymer and fed into the extruder. The extruder is generally operated at a temperature higher than that necessary to cause the composition to flow. The extrude is immediately quenched in a water bath and pelletized. The pellets so prepared can be one-fourth inch long or less as desired. Such pellets can be used for subsequent molding, shaping, or forming.

Transparent compositions can be produced by manipulation of the process used to manufacture the polycarbonate composition. One example of such a process to produce transparent polycarbonate compositions is described in U.S. Patent Application No. 2003/0032725.

Figure 11:
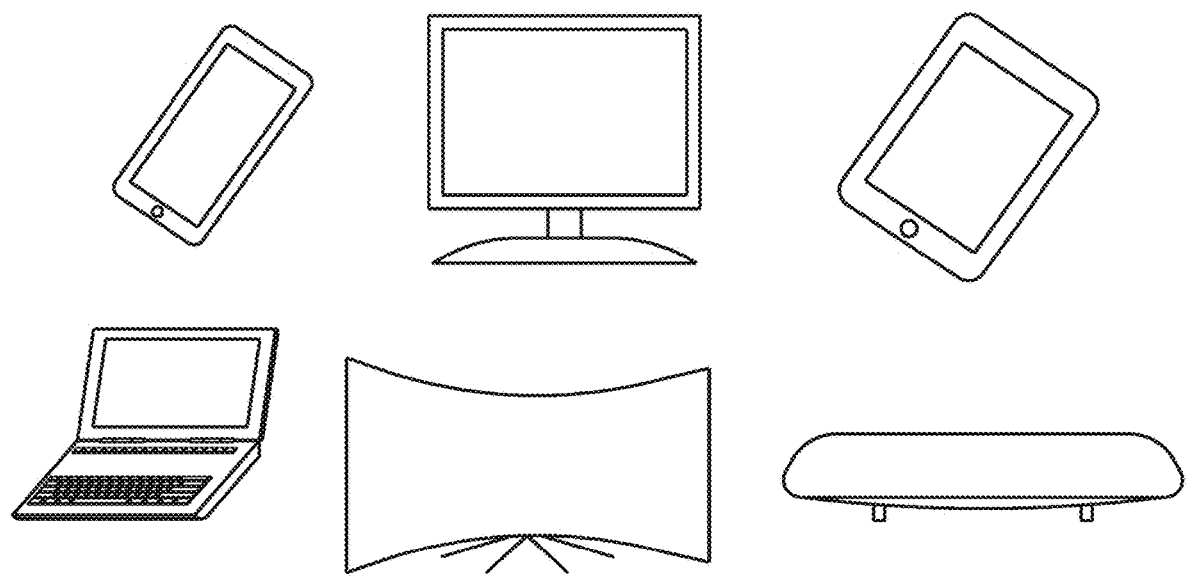
FIG. 11 is a view of various end use products for the multilayer polymeric film disclosed herein.

FIG. 11 shows various examples of electronic display devices of which the multilayer polymeric films described herein can be useful. For example, the multilayer polymeric films can be used in mobile devices, television screens, computer monitors, tablets, mobile electronics, such as laptops, and safety screens in automobiles.

The following examples are merely illustrative of the multilayer polymeric films disclosed herein and are not intended to limit the scope hereof.

EXAMPLES

The following components are used in the examples. Unless specifically indicated otherwise, the amount of each component is in weight percent in the following examples, based on the total weight of the composition.

TABLE 1

Composition Components

| Acronym | Description | Source |
|---|---|---|
| PMMA | poly(methyl methacrylate) | EVONIK |
| PC | BPA polycarbonate made by a melt process with an MVR at 300° C./1.2 kg, of 8.0 g/cm$^3$, a Tg of 145° C., commercially available as LEXAN ™ resin | SABIC |
| PC3 | blend of 64 wt % polycarbonate and 36 wt % amorphous polyester commercially available as XYLEX ™ resin | SABIC |
| PC4 | Polycarbonate copolymer, commercially available as HFD ™ resin | SABIC |
| PC5 | blend of 60 wt % polycarbonate and 40 wt % amorphous polyester commercially available as XYLEX ™ resin | SABIC |

TABLE 2

Test Description and Conditions

| Property | Units | Description (Conditions) | Test | Specimen |
|---|---|---|---|---|
| Haze | % | Gardner Haze-plus instrument with D65 illuminant and 10-degree observer angle | ASTM D1003-00; Procedure A | film sample with desired surface texture produced by pilot extrusion line |
| Transmission | % | Gardner Haze-plus instrument with D65 illuminant and 10-degree observer angle | ASTM D1003-00; Procedure A | film sample with desired surface texture produced by pilot extrusion line |
| Ra, Rp, Rv, Rpc, | | measured using standard surface profiling instruments such as Kosaka1700a Profilometer from Kosaka Laboratories, Tokyo, Japan; using a scan length of 5.6 mm. | ISO 4287:1997 | film sample with desired surface texture produced by pilot extrusion line |
| Lamination | | Visual inspection under backlight | N/A | film sample with desired surface texture produced by pilot extrusion line |

Table 4 and Table 5 list examples of multilayer polymeric films and the corresponding test results after the multilayer polymeric films were laminated to another film. In each example, a 3-layer film was made using a co-extrusion process. The top layer was made of transparent PMMA grade PLEXIGLASS™ 8N from EVONIK. The Tg of this PMMA is 118° C. The materials used for the top layer should be an optically transparent grade (i.e., have a light transmission of greater than or equal to 91% at a thickness of 3 mm, have a pencil hardness of greater than or equal to H, and have a Tg of 110 to 130° C.). Any material meeting these desired characteristics can be used, including copolymers of PMMA. The material for the top layer can provide abrasion and scratch resistance to the multilayer film. The inner layer, representing the bulk of the film was made of polycarbonate (LEXAN™, SD1341 commercially available from SABIC). The polycarbonate used had a Tg of 145° C., a weight average molecular weight of 54,341 Daltons (Mw), a number average molecular weight of 23,255 Daltons (Mn), a melt volume flow rate (MVR) of 8 cubic centimeters per 10 minutes ($cm^3$/10 min), and was made by melt polymerization. Other extrusion grade optical polycarbonate resin can be used. For example, other extrusion grade optical polycarbonate resin having a MVR of 6 to 10 $cm^3$/10 min can be used. The inner layer can offer the film its mechanical advantage and optical clarity. The bottom layer was made of different low glass transition temperature (Tg) polymers having different surface finish levels (different Ra and Rz levels) to demonstrate the impact on performance when the multilayer polymeric films were laminated to an optical film.

The top layer and the bottom layer were made from the same material in each example. Surface roughness for both the top layer and the bottom layer were achieved by similar pattern replication from calendaring rollers under a nip pressure of less than or equal to 10 MPa and a temperature of greater than or equal to 140° C.

The films were made using an extrusion system similar to that illustrated in FIG. 8. Calendaring rollers should have temperatures that are controlled by individual cooling units. A vertical die was used in the examples, but use of a horizontal die is also contemplated.

To demonstrate impact on optical performance, the multilayer films were laminated to both sides of an optical film (before adding diffuser film) having a thickness of less than or equal to 50 μm, and light transmission and haze of the composite stack were measured. Lamination occurred at a temperature of 130 to 170° C.

In the examples, surface roughness was presented in terms of Ra, Rz, and Rpc. These were measured on the respective surface using a Kosaka 1700a surface stylus Profilometer in accordance with ISO 4287:1997.

Table 3 lists the processing conditions for each of the Samples with the main extruder temperature for the middle layer, the co-extruder temperature for the top layer, the co-extruder temperature for the bottom layer, the first roller (e.g., rubber roller), the second roller (e.g., texture steel roller), the third roller (e.g., the polished steel roller), and the NIP pressure of the first and second rollers measured in bar. The middle layer was made from the same polycarbonate in all the Samples.

TABLE 3

Processing Conditions

| | Sample 1 | Sample 2 | Sample 3 | Sample 4 | Sample 5 | Sample 6 | Sample 7 | Sample 8 | Sample 9 |
|---|---|---|---|---|---|---|---|---|---|
| middle layer | 275° C. | 275° C. | 275° C. | 275° C. | 275° C. | 275° C. | 275° C. | 275° C. | 275° C. |
| top layer | 240° C. | 240° C. | 240° C. | 240° C. | 240° C. | 240° C. | 240° C. | 240° C. | 240° C. |
| bottom layer | 240° C. | 255° C. | 240° C. | 250° C. | 250° C. | 250° C. | 250° C. | 250° C. | 275° C. |
| 1st Roller | 25° C. | 25° C. | 25° C. | 25° C. | 25° C. | 25° C. | 25° C. | 25° C. | 25° C. |
| 2nd Roller | 120° C. | 120° C. | 120° C. | 135 | 135 | 125° C. | 125° C. | 125° C. | 125° C. |

TABLE 3-continued

Processing Conditions

| | Sample 1 | Sample 2 | Sample 3 | Sample 4 | Sample 5 | Sample 6 | Sample 7 | Sample 8 | Sample 9 |
|---|---|---|---|---|---|---|---|---|---|
| 3rd Roller | 125° C. | 125° C. | 125° C. | 130 | 130 | 125° C. | 125° C. | 125° C. | 120° C. |
| NIP of 1st and 2nd rollers | 2.5 | 2.5 | 2.5 | 6 | 6 | 6 | 6 | 6 | 5 |

Example 1

Sample 1: A three-layer film having a total thickness of 130 μm was formed using the co-extrusion process described above in the general description of the examples and with respect to FIG. 8. The top layer of the three-layer film was made from PMMA and had a thickness of 10 μm, the inner layer was made from polycarbonate and had a thickness of 115 μm, and the bottom layer was made from PMMA and had a thickness of 5 μm. The bottom layer was made of a PMMA grade having a Tg of 110° C. (EVONIK ZK5BR) to enable lamination without melting the entire multilayer film. After forming the multilayer film, it was laminated to a reflective polarizer film as previously described. Despite good optical performance which means little or no change in light transmission, the lamination performance was not acceptable. Film separation was marginal and bubbles were trapped at the interface between the multilayer film and the reflective polarizer film. This was caused by the excessive roughness of the bottom surface, since the Rz on the outer surface of the bottom layer was 3.09 μm, which was well outside the desirable level of less than 0.75 μm.

Sample 2: A three-layer film having a total thickness of 130 μm was formed. The top layer of the three-layer film was made from the same PMMA as Sample 1 and had a thickness of 10 μm, the inner layer was made from polycarbonate and had a thickness of 115 μm, and the bottom layer was made from a blend of polycarbonate an amorphous polyester (PC3), XYLEX™ 8409, commercially available from SABIC, and had a thickness of 5 μm. The bottom layer was made of PC3 having a Tg of 121° C., again a low enough temperature to enable lamination to a reflective polarizer film without melting the entire film. After forming the multilayer film, it was laminated to a reflective polarizer film as previously described. The film in Sample 2 had issues with lamination performance (e.g., bubbles, striations, imperfections, linear cosmetic defects (i.e., visual effects at the interface), so optical performance was not tested. The lamination performance was still not acceptable due to excessive roughness of the outer surface of the bottom layer. The Rz on the bottom surface was 3.05 μm, which was well outside the desirable level of less than 0.75 μm.

Sample 3: A three-layer film having a total thickness of 130 μm was formed. The top layer of the three-layer film was made from the same PMMA as Sample 1 and had a thickness of 10 μm, the inner layer was made from polycarbonate and had a thickness of 115 μm, and the bottom layer was made from a poly(aliphatic ester) polycarbonate (PC4), HFD™ 1212, commercially available from SABIC and had a thickness of 5 μm. The bottom layer was made of PC4 having a Tg of 132° C., again a low enough temperature to enable lamination to a reflective polarizier film without melting the entire film. This had issues with lamination performance (e.g., bubbles, striations, imperfections, linear cosmetic defects (i.e., visual effects at the interface), so optical performance was not tested. The lamination performance was still not acceptable due to excessive roughness of the bottom surface, since the Rz on the outer surface of the bottom layer was 2.91 μm, which was well outside the desirable level of less than 0.75 μm.

Sample 4: A three-layer film having a total thickness of 75 μm was formed. The top layer of the three-layer film was made from the same PMMA as Sample 1 and had a thickness of 5 μm, the inner layer was made from polycarbonate and had a thickness of 65 μm, and the bottom layer was made from PC5, XYLEX™ X7300CL, commercially available from SABIC and had a thickness of 5 μm. The bottom layer was made of PC5 having a Tg of 112° C., again a low enough temperature to enable lamination to a reflective polarizer film without melting the entire film. This film had good optical performance, with no bubbles observed after laminating a reflective polarizer film to the bottom layer. The Rz of the outer surface of the bottom layer was 0.52 μm, which is within the desirable level of less than 0.75 μm.

Sample 9: A three-layer film having a total thickness of 175 μm was formed. The top layer of the three-layer film was made from the same PMMA as Sample 1 and had a thickness of 10 μm, the inner layer was made from polycarbonate (PC), commercial grade PC LEXAN™ SD1341 and had a thickness of 160 μm, and the bottom layer was made from polycarbonate (PC), commercial grade PC LEXAN™ SD1341, commercially available from SABIC and had a thickness of 5 μm. This is the same polycarbonate used as the inner layer in the other samples. The polycarbonate used had a Tg of 145° C., a weight average molecular weight of 54,341 Daltons (Mw), a number average molecular weight of 23,255 Daltons (Mn), a melt volume flow rate (MVR) of 8 cubic centimeters per 10 minutes ($cm^3$/10 min), and was made by melt polymerization. The PC of the bottom layer had a Tg of 145° C., leading to a poor lamination result with poor bonding force when laminated to a reflective polarizer film because limited heat could be applied or the entire film would melt. At the same time, Sample 9 had issues with bubbles trapped at the interface between the multilayer film and the reflective polarizer film likely caused by excessive roughness of the bottom surface. The Rz of the outer surface of the bottom layer was 2.61 μm, which is well beyond the desirable level of less than 0.75 μm.

TABLE 4

Test results on Mutilayer Films

| | Sample 1 | Sample 2 | Sample 3 | Sample 4 | Sample 9 |
|---|---|---|---|---|---|
| Total | 130 | 130 | 130 | 75 | 175 |
| Top layer (μm) | PMMA 10 | PMMA 10 | PMMA 10 | PMMA 5 | PMMA 10 |
| Inner layer (μm) | PC 115 | PC 115 | PC 115 | PC 65 | PC 160 |
| Bottom layer (μm) | PMMA 5 | PC3 5 | PC4 5 | PC5 5 | PC 5 |
| Tg of Bottom layer/° C. | 110 | 121 | 132 | 112 | 145 |
| Transmission % (Multilayer Film by itself) | 93.0 | 93.6 | 93.8 | 93.3 | 92.0 |
| Haze % (Multilayer Film by itself) | 86.5 | 89.8 | 87.8 | 44.6 | 88.2 |
| Transmission % (Multilayer Film laminated on both sides of a RPF*) | 92.3 | 92.3 | 92.3 | 93.1 | 91.5 |
| Haze % (Multilayer Film laminated on both sides of a RPF*) | 86.0 | 85.2 | 84.8 | 69.0 | 83.5 |
| Ra (μm) on outer surface, Top Layer | 0.74 | 0.65 | 0.66 | 0.55 | 0.71 |
| Rz (μm) on outer surface, Top Layer | 4.80 | 4.66 | 4.67 | 3.82 | 4.56 |
| Rpc (1/cm) on outer surface Top Layer | 109.75 | 103.32 | 110.95 | 84.21 | 110.67 |
| Ra (μm) on outer surface, Bottom Layer | 0.49 | 0.49 | 0.47 | 0.10 | 0.40 |
| Rz (μm) on outer surface, Bottom Layer | 3.09 | 3.05 | 2.91 | 0.52 | 2.61 |
| Rpc (1/cm) on outer surface, Bottom Layer | 69.58 | 76.38 | 72.10 | 24.06 | 90.56 |
| Laminating Brightness Enhancement Film on Bottom layer | Fair, not laminating well | laminating well, but has bubble in the interface | laminating well, but has bubble in the interface | Good, no bubble | Poor bonding force, and has bubbles in the interface |

*RPF = reflective prism film

Sample 5: A three-layer film having a total thickness of 75 μm was formed. The top layer of the three-layer film was made from the same PMMA as Sample 1 and had a thickness of 5 μm, the inner layer was made from polycarbonate and had a thickness of 65 μm, and the bottom layer was made from (PC5), XYLEX™ X7300CL, commercially available from SABIC and had a thickness of 5 μm. The bottom layer was made of PC5 having a Tg of 112° C., again a low enough temperature to enable lamination to a reflective polarizer film without melting the entire film. This film had good optical performance, with no bubbles observed after laminating a reflective polarizer film to the bottom layer. The Rz of the outer surface of the bottom layer was 0.54 μm, which is within the desirable level of less than 0.75 μm.

Sample 6: A three-layer film having a total thickness of 75 μm was formed. The top layer of the three-layer film was made from the same PMMA as Sample 1 and had a thickness of 5 μm, the inner layer was made from polycarbonate and had a thickness of 65 μm, and the bottom layer was made from (PC5), XYLEX™ X7300CL, commercially available from SABIC and had a thickness of 5 μm. The bottom layer was made of PC5 having a Tg of 112° C., again a low enough temperature to enable lamination to a reflective polarizer film without melting the entire film. This film had good optical performance, with no bubbles observed after laminating a reflective polarizer film to the bottom layer. The Rz of the outer surface of the bottom layer was 0.54 μm, which is within the desirable level of less than 0.43 μm.

Sample 7: A three-layer film having a total thickness of 75 μm was formed. The top layer of the three-layer film was made from the same PMMA as Sample 1 and had a thickness of 5 μm, the inner layer was made from polycarbonate and had a thickness of 65 μm, and the bottom layer was made from (PC5), XYLEX™ X7300CL, commercially available from SABIC and had a thickness of 5 μm. The bottom layer was made of PC5 having a Tg of 112° C., again a low enough temperature to enable lamination to a reflective polarizer film without melting the entire film. This film had good optical performance, with no bubbles observed after laminating a reflective polarizer film to the bottom layer. The Rz of the outer surface of the bottom layer was 0.54 μm, which is within the desirable level of less than 0.75 μm.

Sample 8: A three-layer film having a total thickness of 75 μm was formed. The top layer of the three-layer film was made from the same PMMA as Sample 1 and had a thickness of 5 μm, the inner layer was made from polycarbonate and had a thickness of 65 μm, and the bottom layer was made from (PC5), XYLEX™ X7300CL, commercially available from SABIC and had a thickness of 5 μm. The bottom layer was made of PC5 having a Tg of 112° C., again a low enough temperature to enable lamination to a reflective polarizer film without melting the entire film. This film had good optical performance, with no bubbles observed after laminating a reflective polarizer film to the bottom layer. The Rz of the outer surface of the bottom layer was 0.47 μm, which is within the desirable level of less than 0.75 μm.

TABLE 5

Test results on Multilayer Films

| | Sample 5 | Sample 6 | Sample 7 | Sample 8 |
|---|---|---|---|---|
| Total | 75 | 75 | 75 | 75 |
| Top layer (μm) | PMMA 5 | PMMA 5 | PMMA 5 | PMMA 5 |
| Inner layer (μm) | PC 65 | PC 65 | PC 65 | PC 65 |
| Bottom layer (μm) | PC5 5 | PC5 5 | PC5 5 | PC5 5 |
| Tg of Bottom layer/° C. | 112 | 112 | 112 | 112 |
| Transmission % (Multilayer Film by itself) | 93.0 | 93.0 | 93.0 | 93.0 |
| Haze % (Multilayer Film by itself) | 58.1 | 36.3 | 44.8 | 52.8 |
| Transmission % (Multilayer Film laminated on both sides of a RPF*) | 92.7 | 93.1 | 92.8 | 92.7 |
| Haze % (Multilayer Film laminated on both sides of a RPF) | 80.6 | 59.3 | 67.8 | 75.6 |
| Ra (μm) on outer surface, Top Layer | 0.65 | 0.50 | 0.60 | 0.62 |
| Rz (μm) on outer surface, Top Layer | 4.25 | 3.38 | 3.97 | 4.12 |
| Rpc (μm) on outer surface, Top Layer | 103.37 | 77.69 | 83.27 | 85.74 |
| Ra (μm) on outer surface, Bottom Layer | 0.10 | 0.08 | 0.07 | 0.09 |
| Rz (μm) on outer surface, Bottom Layer | 0.54 | 0.43 | 0.43 | 0.47 |
| Rpc (1/cm) on outer surface, Bottom Layer | 31.89 | 29.37 | 27.44 | 27.46 |
| Laminating Brightness Enhancement Film on Bottom layer | Good, no bubble | Good, no bubble | Good, no bubble | Good, no bubble |

*RPF = reflective polarizer film

Samples 1-8 demonstrate that with a bottom layer comprising a material having a glass transition temperature of less than or equal to 140° C., lamination can occur without losing structural features of the stack (e.g., surface roughness). Samples 4-8 all demonstrate that when the surface roughness Rz of the outer surface of the bottom layer is less than or equal to 0.75 μm, for example, less than or equal to 0.55 μm, for example, less than or equal to 0.50 μm, not only were haze and transmission properties retained, meaning that the functionality of the film was retained, but there were also acceptable laminating results after a reflective polarizer film was laminated to the bottom layer of the multilayer film. As noted in Samples 1-3, higher surface roughness values on the outer surface of the bottom layer compromised the ability of the multilayer film to be laminated to a reflective polarizer film. For example, Sample 1 failed to laminate well, meaning that the films did not laminate well to one another with delamination or a weak peeling force between the two, while Samples 2 and 3 laminated well, but suffered from the appearance of bubbles which means that the two surfaces did not match and join properly. To the contrary, in Samples 4-8, the lamination was successful in without the appearance of bubbles.

The multilayer films and methods of making thereof disclosed herein include(s) at least the following embodiments:

Embodiment 1: A multilayer polymeric film, comprising: a top layer comprising poly(methyl methacrylate); a bottom layer comprising a bottom layer composition comprising poly(methyl methacrylate), polycarbonate, copolymers thereof, or a combination comprising at least one of the foregoing, wherein a glass transition temperature of the bottom layer composition is less than or equal to 140° C.; and an inner layer disposed between an inside surface of the top layer and an inside surface of the bottom layer, wherein the inner layer comprises polycarbonate.

Embodiment 2: The multilayer polymeric film of Embodiment 1, wherein the glass transition temperature of the bottom layer is 100° C. to 140° C., preferably wherein the glass transition temperature is 100° C. to 110° C., more preferably wherein the glass transition temperature is 110° C.

Embodiment 3: The multilayer polymeric film of Embodiment 1 or Embodiment 2, wherein the bottom layer composition comprises a copolymer of polycarbonate and polyester, preferably wherein the polyester comprises amorphous polyester.

Embodiment 4: The multilayer polymeric film of any of the preceding embodiments, wherein the bottom layer composition comprises a poly(aliphatic ester) polycarbonate copolymer.

Embodiment 5: The multilayer polymeric film of any of the preceding embodiments, wherein a thickness of the top layer is 5 micrometers to 30 micrometers.

Embodiment 6: The multilayer polymeric film of any of the preceding embodiments, wherein a thickness of the inner layer is 50 micrometers to 200 micrometers.

Embodiment 7: The multilayer polymeric film of any of the preceding embodiments, wherein a thickness of the bottom layer is 1 micrometer to 10 micrometers.

Embodiment 8: The multilayer polymeric film of any of the preceding embodiments, wherein an average surface roughness Rz of an outside surface of the bottom layer is less than or equal to 0.75 micrometers as measured according to ISO 4287, preferably wherein the average surface roughness Rz is less than or equal to 0.5 micrometers.

Embodiment 9: The multilayer polymeric film of any of the preceding embodiments, further comprising a film directly laminated to an outside surface of the bottom layer, preferably wherein the film is an optical film.

Embodiment 10: An article comprising the multilayer polymeric film of any of the preceding embodiments, preferably wherein the article is an electronic display, flat panel display, a window, or a lighting cover, preferably wherein the article is a computer screen, a tablet, a mobile device, a television screen, a projection display, a traffic signal, or a billboard, more preferably wherein the electronic display is a high definition display, most preferably wherein the high definition display is an ultrahigh definition display, even more preferably wherein the ultrahigh definition display is an ultrahigh definition television screen.

Embodiment 11: An optical film for use in an electronic display, comprising: an optical film and the multilayer polymeric film of any of Embodiments 1-9 disposed on a single outside surface or on both outside surfaces of the optical film.

Embodiment 12: An electronic display, comprising: a light guide; an optical film disposed adjacent to the light guide, wherein the multilayer polymeric film of any of Embodiments 1-9 is disposed on either or both sides of the optical film; an image producer disposed adjacent to the optical film; and a substrate disposed adjacent to the image producer.

Embodiment 13: A method of making the multilayer polymeric film of any of Embodiments 1-9, comprising: co-extruding the top layer, the bottom layer, and the inner layer disposed between an inside surface of the top layer and an inside surface of the bottom layer.

Embodiment 14: The method of Embodiment 13, further comprising directly laminating an outside surface of the bottom layer to an optical film.

Embodiment 15: The method of Embodiment 14, wherein the lamination temperature is 130 to 170° C. for a time period of 2 to 3 minutes.

Embodiment 16: The method of any of Embodiments 13-15, further comprising texturing an outside surface of the bottom layer to an average surface roughness Rz of less than or equal to 0.75 micrometers as measured according to ISO 4287, preferably wherein the average surface roughness Rz is less than or equal to 0.5 micrometers.

Embodiment 17: A multilayer polymeric film, comprising: a top layer comprising a material with a glass transition temperature of 100 to 150° C.; a bottom layer comprising a bottom layer composition; and an inner layer disposed between an inside surface of the top layer and an inside surface of the bottom layer, wherein a glass transition temperature of the inner layer is 125 to 175° C.; wherein a glass transition temperature of the inner layer is 0.25 to 75° lower than the glass transition temperature of the top layer or the bottom layer.

Embodiment 18: The multilayer polymeric film of Embodiment 17, wherein the top layer comprises poly(methyl methacrylate), the bottom layer comprises a bottom layer composition comprising poly(methyl methacrylate), polycarbonate, copolymers thereof, or a combination comprising at least one of the foregoing; and the inner layer comprises polycarbonate.

Embodiment 19: The multilayer polymeric film of Embodiment 17 or Embodiment 18, wherein the bottom layer composition comprises a copolymer of polycarbonate and polyester, preferably wherein the polyester comprises amorphous polyester, preferably wherein the bottom layer composition comprises a poly(aliphatic ester) polycarbonate copolymer.

Embodiment 20: The multilayer polymeric film of any of Embodiments 17-19, further comprising a film directly laminated to an outside surface of the bottom layer, preferably wherein the film is an optical film.

Embodiment 21: The multilayer polymeric film of any of Embodiments 17-20, wherein an average surface roughness Rz of an outside surface of the bottom layer is less than or equal to 0.75 micrometers as measured according to ISO 4287, preferably wherein the average surface roughness Rz is less than or equal to 0.5 micrometers.

In general, the invention may alternately comprise, consist of, or consist essentially of, any appropriate components herein disclosed. The invention may additionally, or alternatively, be formulated so as to be devoid, or substantially free, of any components, materials, ingredients, adjuvants or species used in the prior art compositions or that are otherwise not necessary to the achievement of the function and/or objectives of the present invention. The endpoints of all ranges directed to the same component or property are inclusive and independently combinable (e.g., ranges of "less than or equal to 25 wt %, or 5 wt % to 20 wt %," is inclusive of the endpoints and all intermediate values of the ranges of "5 wt % to 25 wt %," etc.). Disclosure of a narrower range or more specific group in addition to a broader range is not a disclaimer of the broader range or larger group. "Combination" is inclusive of blends, mixtures, alloys, reaction products, and the like. Furthermore, the terms "first," "second," and the like, herein do not denote any order, quantity, or importance, but rather are used to denote one element from another. The terms "a" and "an" and "the" herein do not denote a limitation of quantity, and are to be construed to cover both the singular and the plural, unless otherwise indicated herein or clearly contradicted by context. "Or" means "and/or." The suffix "(s)" as used herein is intended to include both the singular and the plural of the term that it modifies, thereby including one or more of that term (e.g., the film(s) includes one or more films). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

The modifier "about" used in connection with a quantity is inclusive of the stated value and has the meaning dictated by the context (e.g., includes the degree of error associated with measurement of the particular quantity). The notation "±10%" means that the indicated measurement can be from an amount that is minus 10% to an amount that is plus 10% of the stated value. The terms "front", "back", "bottom", and/or "top" are used herein, unless otherwise noted, merely for convenience of description, and are not limited to any one position or spatial orientation. "Optional" or "optionally" means that the subsequently described event or circumstance can or cannot occur, and that the description includes instances where the event occurs and instances where it does not. Unless defined otherwise, technical and scientific terms used herein have the same meaning as is commonly understood by one of skill in the art to which this invention belongs. A "combination" is inclusive of blends, mixtures, alloys, reaction products, and the like.

Unless otherwise specified herein, any reference to standards, regulations, testing methods and the like, such as ASTM D1003, ASTM D4935, ASTM 1746, FCC part 18, CISPR11, and CISPR 19 refer to the standard, regulation, guidance or method that is in force at the time of filing of the present application.

The compositions, methods, and articles can alternatively comprise, consist of, or consist essentially of, any appropriate components or steps herein disclosed. The compositions, methods, and articles can additionally, or alternatively, be formulated so as to be devoid, or substantially free, of any steps, components, materials, ingredients, adjuvants, or species that are otherwise not necessary to the achievement of the function or objectives of the compositions, methods, and articles.

As used herein, the term "hydrocarbyl" and "hydrocarbon" refers broadly to a substituent comprising carbon and hydrogen, optionally with 1 to 3 heteroatoms, for example, oxygen, nitrogen, halogen, silicon, sulfur, or a combination thereof; "alkyl" refers to a straight or branched chain, saturated monovalent hydrocarbon group; "alkylene" refers to a straight or branched chain, saturated, divalent hydrocarbon group; "alkylidene" refers to a straight or branched chain, saturated divalent hydrocarbon group, with both valences on a single common carbon atom; "alkenyl" refers to a straight or branched chain monovalent hydrocarbon group having at least two carbons joined by a carbon-carbon double bond; "cycloalkyl" refers to a non-aromatic monovalent monocyclic or multicylic hydrocarbon group having at least three carbon atoms, "cycloalkenyl" refers to a non-aromatic cyclic divalent hydrocarbon group having at least three carbon atoms, with at least one degree of unsaturation; "aryl" refers to an aromatic monovalent group containing only carbon in the aromatic ring or rings; "arylene"

refers to an aromatic divalent group containing only carbon in the aromatic ring or rings; "alkylaryl" refers to an aryl group that has been substituted with an alkyl group as defined above, with 4-methylphenyl being an exemplary alkylaryl group; "arylalkyl" refers to an alkyl group that has been substituted with an aryl group as defined above, with benzyl being an exemplary arylalkyl group; "acyl" refers to an alkyl group as defined above with the indicated number of carbon atoms attached through a carbonyl carbon bridge (—C(=O)—); "alkoxy" refers to an alkyl group as defined above with the indicated number of carbon atoms attached through an oxygen bridge (—O—); and "aryloxy" refers to an aryl group as defined above with the indicated number of carbon atoms attached through an oxygen bridge (—O—).

Unless otherwise indicated, each of the foregoing groups can be unsubstituted or substituted, provided that the substitution does not significantly adversely affect synthesis, stability, or use of the compound. The term "substituted" as used herein means that at least one hydrogen on the designated atom or group is replaced with another group, provided that the designated atom's normal valence is not exceeded. When the substituent is oxo (i.e., =O), then two hydrogens on the atom are replaced. Combinations of substituents or variables are permissible provided that the substitutions do not significantly adversely affect synthesis or use of the compound. Exemplary groups that can be present on a "substituted" position include, but are not limited to, cyano; hydroxyl; nitro; azido; alkanoyl (such as a $C_{2-6}$ alkanoyl group such as acyl); carboxamido; $C_{1-6}$ or $C_{1-3}$ alkyl, cycloalkyl, alkenyl, and alkynyl (including groups having at least one unsaturated linkages and from 2 to 8, or 2 to 6 carbon atoms); $C_{1-6}$ or $C_{1-3}$ alkoxys; $C_{6-10}$ aryloxy such as phenoxy; $C_{1-6}$ alkylthio; $C_{1-6}$ or $C_{1-3}$ alkylsulfinyl; $C_{1-6}$ or $C_{1-3}$ alkylsulfonyl; aminodi($C_{1-6}$ or $C_{1-3}$)alkyl; $C_{6-12}$ aryl having at least one aromatic rings (e.g., phenyl, biphenyl, naphthyl, or the like, each ring either substituted or unsubstituted aromatic); $C_{7-19}$ arylalkyl having 1 to 3 separate or fused rings and from 6 to 18 ring carbon atoms; or arylalkoxy having 1 to 3 separate or fused rings and from 6 to 18 ring carbon atoms, with benzyloxy being an exemplary arylalkoxy.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

The invention claimed is:

1. A multilayer polymeric film, comprising:
a top layer comprising poly(methyl methacrylate);
a bottom layer comprising a bottom layer composition comprising polycarbonate and polyester, or copolymers thereof, wherein a glass transition temperature of the bottom layer composition is less than or equal to 140° C.;
an inner layer disposed between an inside surface of the top layer and an inside surface of the bottom layer, wherein the inner layer comprises polycarbonate;
wherein the inner layer is compositionally different from the bottom layer; and
wherein an average surface roughness Rz of an outside surface of the bottom layer is less than or equal to 0.75 micrometers as measured according to ISO 4287.

2. The multilayer polymeric film of claim 1, wherein the glass transition temperature of the bottom layer is 100° C. to 140° C.

3. The multilayer polymeric film of claim 1, wherein the bottom layer composition comprises a copolymer of polycarbonate and polyester; and wherein the inside surface of the bottom layer is in direct physical contact with a neighboring surface of the inner layer with no intervening layer present.

4. The multilayer polymeric film of claim 1, wherein the bottom layer composition comprises a poly(aliphatic ester) polycarbonate copolymer.

5. The multilayer polymeric film of claim 1, wherein a thickness of the top layer is 5 micrometers to 30 micrometers.

6. The multilayer polymeric film of claim 1, wherein a thickness of the inner layer is 50 micrometers to 200 micrometers.

7. The multilayer polymeric film of claim 1, wherein a thickness of the bottom layer is 1 micrometer to 10 micrometers.

8. The multilayer polymeric film of claim 1, further comprising a film directly laminated to an outside surface of the bottom layer.

9. An article comprising the multilayer polymeric film of claim 1.

10. An optical film for use in an electronic display, comprising:
an optical film and the multilayer polymeric film of claim 1 disposed on a single outside surface or on both outside surfaces of the optical film.

11. An electronic display, comprising:
a light guide;
an optical film disposed adjacent to the light guide, wherein the multilayer polymeric film of claim 1 is disposed on either or both sides of the optical film;
an image producer disposed adjacent to the optical film; and
a substrate disposed adjacent to the image producer.

12. The multilayer polymeric film of claim 1, wherein the multilayer polymeric film has only three layers.

13. The multilayer polymeric film of claim 1, wherein the polyester comprises amorphous polyester.

14. The multilayer polymeric film of claim 1,
wherein the inner layer comprises polycarbonate and is free of a polyester; the inner layer is compositionally different from the bottom layer; and wherein the inside surface of the bottom layer is in direct physical contact with a neighboring surface of the inner layer with no intervening layer present.

15. The multilayer polymeric film of claim 8, wherein the film directly laminated to an outside surface of the bottom layer is an optical film.

16. The article of claim 9, wherein the article is an electronic display or flat panel display.

17. A method of making a multilayer polymeric film of comprising:
a top layer comprising poly(methyl methacrylate);
a bottom layer comprising a bottom layer composition comprising polycarbonate and polyester, or copolymers thereof, wherein a glass transition temperature of the bottom layer composition is less than or equal to 140° C.;

an inner layer disposed between an inside surface of the top layer and an inside surface of the bottom layer, wherein the inner layer comprises polycarbonate; and wherein the inner layer is compositionally different from the bottom layer, the method comprising:

co-extruding the top layer, the bottom layer, and the inner layer disposed between an inside surface of the top layer and an inside surface of the bottom layer, and texturing an outside surface of the bottom layer to an average surface roughness Rz of less than or equal to 0.75 micrometers as measured according to ISO 4287.

18. The method of claim 17, further comprising directly laminating an outside surface of the bottom layer to an optical film.

\* \* \* \* \*